United States Patent
Ahmed

(10) Patent No.: US 12,327,114 B2
(45) Date of Patent: Jun. 10, 2025

(54) PROCESSING CORES AND INFORMATION TRANSFER CIRCUITS ARRANGED IN MATRIX

(71) Applicant: Preferred Networks, Inc., Tokyo (JP)

(72) Inventor: Tanvir Ahmed, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 0 days.

(21) Appl. No.: 17/447,316

(22) Filed: Sep. 10, 2021

(65) Prior Publication Data

US 2021/0406010 A1    Dec. 30, 2021

Related U.S. Application Data

(63) Continuation of application No. 16/671,428, filed on Nov. 1, 2019, now Pat. No. 11,119,765.

(30) Foreign Application Priority Data

Nov. 9, 2018 (JP) .................. 2018-211312

(51) Int. Cl.
G06F 9/30 (2018.01)
G06F 15/80 (2006.01)
G06N 3/08 (2023.01)

(52) U.S. Cl.
CPC ........ *G06F 9/3001* (2013.01); *G06F 9/30145* (2013.01); *G06F 15/8046* (2013.01); *G06N 3/08* (2013.01)

(58) Field of Classification Search
CPC ............................ G06F 9/3001; G06F 15/8046
See application file for complete search history.

(56) References Cited

U.S. PATENT DOCUMENTS 5,325,526 A    6/1994   Cameron et al.
5,581,767 A    12/1996  Katsuki et al.
(Continued)

FOREIGN PATENT DOCUMENTS

EP    0557997      9/1993
JP    H05-242065   9/1993
(Continued)

OTHER PUBLICATIONS

Ambrose Finnerty, "Versal: AI Engine & Programming Environment", XDF (Xilinx Developer Forum), Oct. 16, 2018. https://www.xilinx.com/publications/events/developer-forum/2018-frankfurt/versal-ai-engine-and-programming-environment.pdf.
(Continued)

*Primary Examiner* — Michael J Metzger
(74) *Attorney, Agent, or Firm* — IPUSA, PLLC

(57) ABSTRACT

A processor having a systolic array that can perform operations efficiently is provided. The processor includes multiple processing cores aligned in a matrix, and each of the processing cores includes an arithmetic unit array including multiple arithmetic units that can form a systolic array. Each of the processing cores includes a first memory that stores first data, a second memory that stores second data, a first multiplexer that connects a first input for receiving the first data at the arithmetic unit array to an output of the first memory in the processing core or an output of the arithmetic unit array in an adjacent processing core, and a second multiplexer that connects a second input for receiving the second data at the arithmetic unit array to an output of the second memory in the processing core or an output of the arithmetic unit array in an adjacent processing core.

20 Claims, 22 Drawing Sheets

(56) References Cited

U.S. PATENT DOCUMENTS

| | | | |
|---|---|---|---|
| 5,970,232 | A | 10/1999 | Passint et al. |
| 6,304,568 | B1 | 10/2001 | Kim |
| 6,496,813 | B1 | 12/2002 | Labreche et al. |
| 6,539,368 | B1 | 3/2003 | Chernikov et al. |
| 9,691,019 | B1 | 6/2017 | Gulland et al. |
| 9,721,203 | B1 | 8/2017 | Young et al. |
| 9,747,546 | B2 | 8/2017 | Ross et al. |
| 9,805,303 | B2 | 10/2017 | Ross et al. |
| 9,842,293 | B2 | 12/2017 | Young |
| 9,928,884 | B1 | 3/2018 | Gou et al. |
| 9,940,573 | B2 | 4/2018 | Young et al. |
| 9,952,831 | B1 | 4/2018 | Ross et al. |
| 2014/0142929 | A1 | 5/2014 | Seide et al. |
| 2017/0103314 | A1 | 4/2017 | Ross |
| 2017/0103315 | A1 | 4/2017 | Thorson et al. |
| 2017/0140273 | A1 | 5/2017 | Sagher et al. |
| 2018/0165577 | A1 | 6/2018 | Young et al. |
| 2018/0189639 | A1 | 7/2018 | Henry et al. |
| 2019/0057061 | A1* | 2/2019 | Targowski ............ G06F 9/5083 |
| 2019/0129885 | A1* | 5/2019 | Kim ....................... G06N 3/063 |

FOREIGN PATENT DOCUMENTS

| | | |
|---|---|---|
| JP | H07-13945 | 1/1995 |
| JP | H10-222480 | 8/1998 |
| JP | 2014-016957 | 1/2014 |
| JP | 2018-521374 | 8/2018 |

OTHER PUBLICATIONS

Yukio Kikuya, "Implementation and evaluation of time division multiplexed systolic ring," IEICE Technical Report, vol. 117, No. 379, pp. 31-36 (Jan. 11, 2018).

* cited by examiner

FIG.19

| | CYC1 | CYC2 | CYC3 | CYC4 | CYC5 | CYC6 | CYC7 | CYC8 | CYC9 |
|---|---|---|---|---|---|---|---|---|---|
| PE0 (Z0–Z2) | X0*Y0 | X1*Y1 | X3*Y2 | X4*Y3 | X1*Y0 | X2*Y1 | X4*Y2 | X5*Y3 | X2*Y0 |
| PE1 (Z9–Z11) | | X0*Y4 | X1*Y5 | X3*Y6 | X4*Y7 | X1*Y4 | X2*Y5 | X4*Y6 | X5*Y7 |
| PE2 (Z18–Z20) | | | X0*Y8 | X1*Y9 | X3*Y10 | X4*Y11 | X1*Y8 | X2*Y9 | X4*Y10 |
| PE3 (Z3–Z5) | | X3*Y0 | X4*Y1 | X6*Y2 | X7*Y3 | X4*Y0 | X5*Y1 | X7*Y2 | X8*Y3 |
| PE4 (Z12–Z14) | | | X3*Y4 | X4*Y5 | X6*Y6 | X7*Y7 | X4*Y4 | X5*Y5 | X7*Y6 |
| PE5 (Z21–Z23) | | | | X3*Y8 | X4*Y9 | X6*Y10 | X7*Y11 | X4*Y8 | X5*Y9 |
| PE6 (Z6–Z8) | | | X6*Y0 | X7*Y1 | 0*Y2 | 0*Y3 | X7*Y0 | X8*Y1 | 0*Y2 |
| PE7 (Z15–Z17) | | | | X6*Y4 | X7*Y5 | 0*Y6 | 0*Y7 | X7*Y4 | X8*Y5 |
| PE8 (Z24–Z26) | | | | | X6*Y8 | X7*Y9 | 0*Y10 | 0*Y11 | X7*Y8 |

FIG.20

| | CYC10 | CYC11 | CYC12 | CYC13 | CYC14 | CYC15 | CYC16 |
|---|---|---|---|---|---|---|---|
| PE0 (Z0-Z2) | 0*Y1 | X5*Y2 | 0*Y3 | | | | |
| PE1 (Z9-Z11) | X2*Y4 | 0*Y5 | X5*Y6 | 0*Y7 | | | |
| PE2 (Z18-Z20) | X5*Y11 | X2*Y8 | 0*Y9 | X5*Y10 | 0*Y11 | | |
| PE3 (Z3-Z5) | X5*Y0 | 0*Y1 | X8*Y2 | 0*Y3 | | | |
| PE4 (Z12-Z14) | X8*Y7 | X5*Y4 | 0*Y5 | X8*Y6 | 0*Y7 | | |
| PE5 (Z21-Z23) | X7*Y10 | X8*Y11 | X5*Y8 | 0*Y9 | X8*Y10 | 0*Y11 | |
| PE6 (Z6-Z8) | 0*Y3 | X8*Y0 | 0*Y1 | 0*Y2 | 0*Y3 | | |
| PE7 (Z15-Z17) | 0*Y6 | 0*Y7 | X8*Y4 | 0*Y5 | 0*Y6 | 0*Y7 | |
| PE8 (Z24-Z26) | X8*Y9 | 0*Y10 | 0*Y11 | X8*Y8 | 0*Y9 | 0*Y10 | 0*Y11 |

PROCESSING CORES AND INFORMATION TRANSFER CIRCUITS ARRANGED IN MATRIX

CROSS-REFERENCE TO RELATED APPLICATIONS

This application is a continuation of U.S. patent application Ser. No. 16/671,428 filed on Nov. 1, 2019, which is based on and claims priority to Japanese patent application No. 2018-211312 filed on Nov. 9, 2018. The entire contents of these applications are hereby incorporated by reference.

BACKGROUND

1. Technical Field

The disclosure herein relates to a processor and a control method for the processor.

2. Description of the Related Art

In recent years, deep learning using deep neural networks (DNNs) has improved the accuracy of image recognition, voice recognition and others. Also, processors specialized for convolutional operations in the deep learning have been proposed. This type of processor has a systolic array including a plurality of arithmetic cells arranged in a matrix. Then, the convolutional operations are performed by supplying input data in the row direction of the systolic array, supplying weight data in the column direction of the systolic array and performing multiplication and accumulation on the plurality of input data and the plurality of weight data sequentially.

For a systolic array having a fixed size, there is a case where the size of the systolic array may not be sufficient due to a large amount of data being processed in the deep learning. In this case, it is necessary to divide the data to be processed, load divided data portions multiple times and perform convolutional operations for the respective data portions multiple times, which may reduce the processing efficiency. Also in the case where the convolutional operations are performed while outputting input data from a buffer sequentially, for example, if a stride value for the input data is changed, it is necessary to store the input data corresponding to the stride value again.

SUMMARY

In light of the above problem, one objective of the present disclosure is to provide a processor that can perform operations efficiently.

One aspect of the present disclosure relates to a processor, comprising: a plurality of processing cores, each of the processing cores including an arithmetic unit array including a plurality of arithmetic units, wherein each of the processing cores includes: a first memory that stores first data; a second memory that stores second data; a first multiplexer that connects a first input for receiving the first data at the arithmetic unit array to an output of the first memory in the processing core or an output of the arithmetic unit array in an adjacent processing core; and a second multiplexer that connects a second input for receiving the second data at the arithmetic unit array to an output of the second memory in the processing core or an output of the arithmetic unit array in an adjacent processing core.

BRIEF DESCRIPTION OF THE DRAWINGS

Other objects and further features of the present invention will be apparent from the following detailed description when read in conjunction with the accompanying drawings, in which:

FIG. 19 is a drawing for illustrating the convolutional operation executed by PE0 to PE8 in FIG. 18 according to one embodiment of the present disclosure;

FIG. 20 is another drawing for illustrating the convolutional operation executed by PE0 to PE8 in FIG. 18 according to one embodiment of the present disclosure;

DESCRIPTION OF THE PREFERRED EMBODIMENTS

Embodiments of the present disclosure are described in detail below with reference to the drawings.

Figure 1:
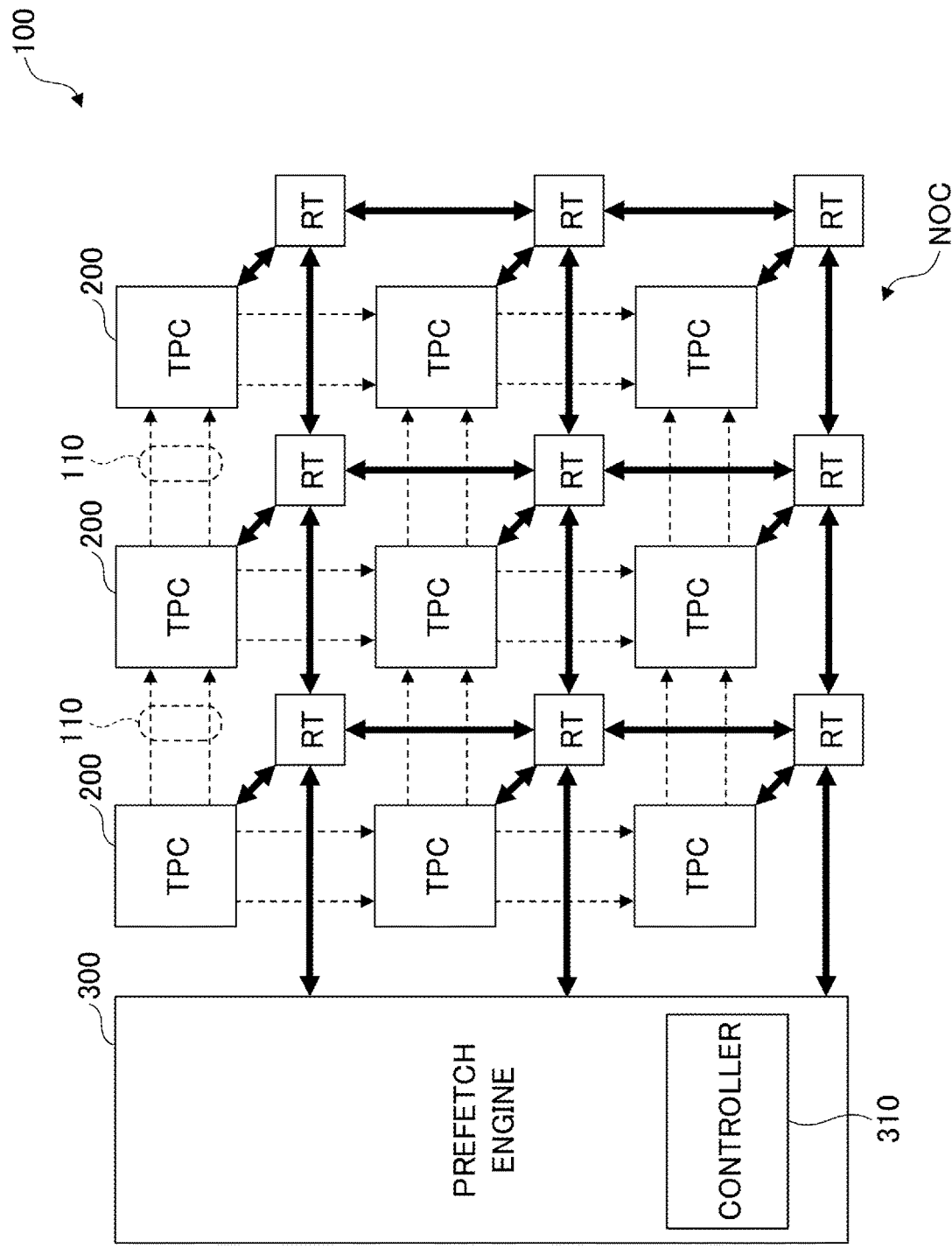
FIG. 1 is a block diagram for illustrating an arrangement of a processor according to one embodiment of the present disclosure.

FIG. 1 is a block diagram for illustrating an arrangement of a processor according to one embodiment of the present disclosure. The processor 100 includes a plurality of processing cores 200 (TPC: Tensor Processing Core) and a prefetch engine 300 for controlling operations of the processor 100, which are interconnected via a network-on-chip NOC (simply referred to as a NOC hereinafter). The plurality of processing cores 200 are arranged in a matrix, for example, and each processing core 200 is connected to a corresponding router RT of a plurality of routers RTs provided in the NOC. Note that the placement of the processing cores 200 is not limited to a matrix. For example, the orientation of the plurality of processing cores 200 may be not only the vertical direction and the horizontal direction but also a diagonal (e.g., a staggered shape) direction.

In the example of FIG. 1, the processor 100 has three-by-three, that is, total nine processing cores 200 composed of three rows and three columns in the horizontal direction and the vertical direction, respectively. However, the processor 100 may have the processing cores 200 aligned in one row by n columns or in n rows by one column. In other words, the number of processing cores 200 only has to be more than or equal to two. For example, the processor 100 may have the processing cores 200, the number of which is sixteen in the vertical direction and 256 in the horizontal direction. Preferably, the respective numbers of processing cores 200 in the vertical and horizontal directions are the same, but the respective numbers may be different. The processing core 200 may be also referred to as a TPC 200 hereinafter.

The adjacent TPCs 200 are connected via one or more dedicated transmission paths 110 (dashed arrows) that may be different from the NOC. By the transmission path 110, for example, information such as data (input data and weight data) or instructions can be transmitted in the right direction and the downward direction from the TPC 200 located in the upper-left side in FIG. 1.

The prefetch engine 300 includes functionalities corresponding to an L2 cache, for example, and has a controller 310 for controlling transmissions of information to the TPCs 200 and transmissions of information between the TPCs 200. The controller 310 forwards information from an upper system to one or more predetermined TPCs 200, receives information from the TPCs 200, or controls routing by the routers RTs contained in the NOC to transfer information between the TPCs 200.

Information, such as input data, weight data and instructions, that is output from the prefetch engine 300 to the TPCs 200 is forwarded to the TPCs 200 via the horizontally aligned routers RTs in FIG. 1 and is not forwarded between the vertically aligned routers RTs in FIG. 1. Similarly, information such as convolutional results (feature maps) output from the TPCs 200 to the prefetch engine 300 is forwarded to the prefetch engine 300 via the horizontally aligned routers RTs in FIG. 1 and is not forwarded between the vertically aligned routers RTs in FIG. 1. In this manner, crossing of the information within the routers RTs can be prevented, and the transfer efficiency of the information between the prefetch engine 300 and the TPCs 200 can be improved.

Figure 2:
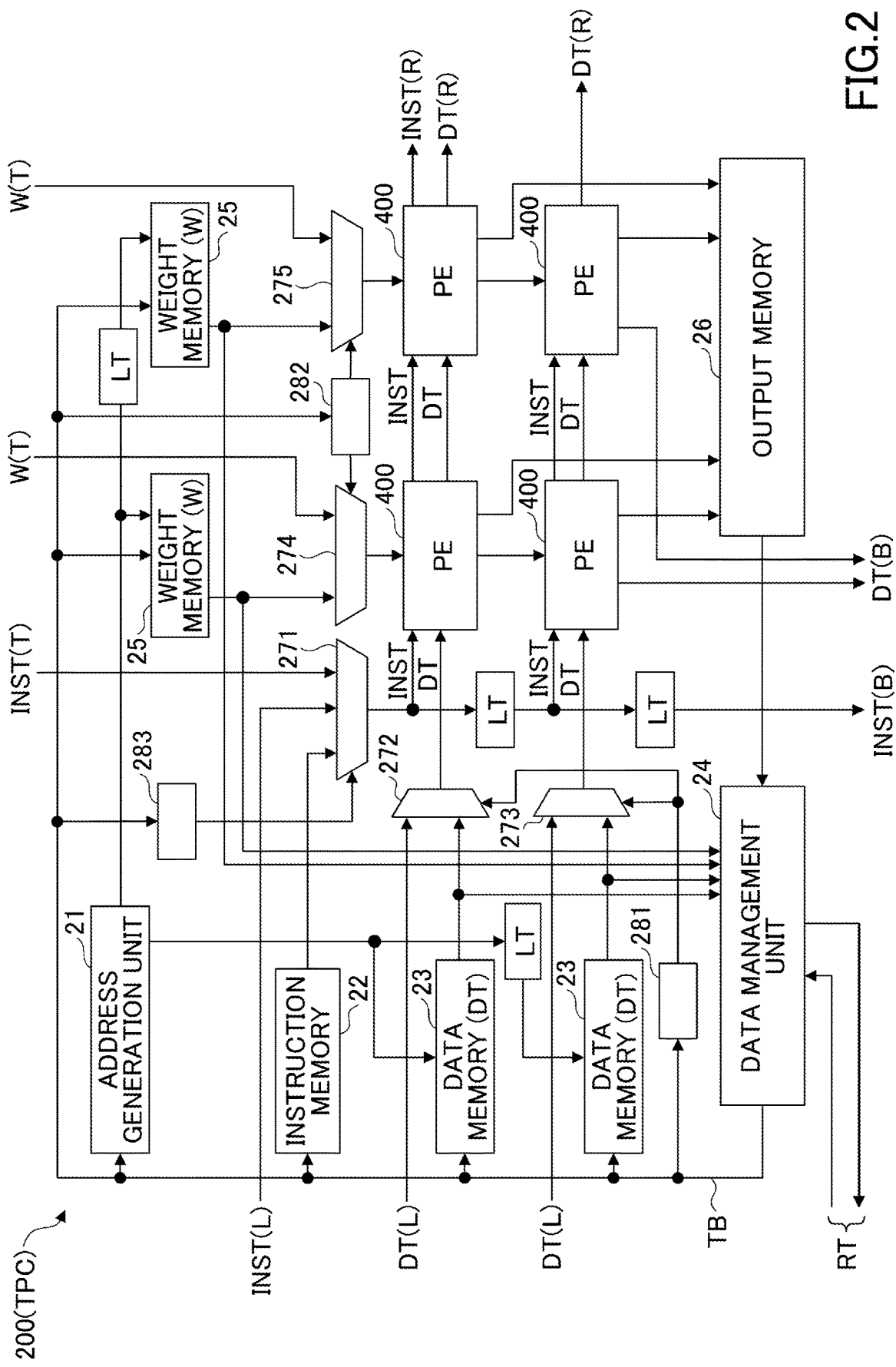
FIG. 2 is a block diagram for illustrating an arrangement of a processing core in FIG. 1 according to one embodiment of the present disclosure.

FIG. 2 is a block diagram for illustrating one exemplary arrangement of the processing core (TPC) 200 as illustrated in FIG. 1. The TPC 200 includes a plurality of processing elements 400 (PEs) arranged in a matrix, an address generation unit 21, an instruction memory 22, a plurality of data memories 23, a data management unit 24, a plurality of weight memories 25 and an output memory 26. The TPC 200 also includes multiplexers 27 (271, 272, 273, 274, 275), reconfiguration control units (281, 282, 283) and a plurality of latches LTs.

One of the data memory 23 and the weight memory 25 is one example of a first memory capable of storing first data that is one of input data DT and a weight W. The other of the data memory 23 and the weight memory 25 is one example of a second memory capable of storing second data that is the other of the input data DT and the weight W. Hereinafter, the processing element 400 may be also referred to as the PE 400. Further, although the following description is focused on cases in which convolutional operations are performed, any other operations may be performed.

For example, the controller 310 illustrated in FIG. 1 controls the routers RTs to control transmissions of the input data DT to the data memories 23, transmissions of the weight data W to the weight memories 25 and transmissions of an instruction INST to the instruction memory 22. Also, the controller 310 controls operations of the multiplexers 271-275. Hereinafter, the input data DT may be referred to as the data DT, and the weight data W may be referred to as the weight W. Also, the input data DT and the weight data W may be collectively referred to as data.

For example, the TPC 200 has four PEs 400 composed of two vertically aligned PEs 400 and two horizontally aligned PEs 400, but the number of PEs 400 is not limited to four. The TPC 200 may have PEs 400 composed of three or more vertically aligned PEs 400 and three or more horizontally aligned PEs 400. However, as will be described below, in this embodiment, a systolic array can be formed by coupling a predetermined number of PEs 400 between the plurality of TPCs 200, and accordingly the TPC 200 only needs to have a minimum number of (that is, four) PEs 400. The PE 400 serves as an arithmetic unit, and a PE array serving as one exemplary arithmetic unit array is composed of a plurality of PEs 400 included in the respective TPCs 200.

The address generation unit 21 generates addresses for outputting to the data memories 23 and addresses for outputting to the weight memories 25 based on address generation information supplied from the controller 310 through the data management unit 24. The address generation unit 21 serves as a first address generator for generating addresses to for outputting to the data memories 23 and a second address generator for generating addresses for outputting to the weight memories 25.

The address generation unit 21 generates addresses based on the address generation information and outputs the generated addresses to the data memories 23, for example, so that the data DT can be output from the data memories 23 in order corresponding to the addresses. Accordingly, the data DT stored in the data memories 23 can be output in any order, and a stride value or the like can be changed without storing the data DT in the data memories 23 again. The weight W can also be output from the weight memories 25 in any order corresponding to the addresses. As a result, load cycles of the data DT and the weight W can be reduced, and the efficiency of convolutional operations by the processor 100 can be improved.

The instruction memory 22 may store an instruction INST supplied from the prefetch engine 300 via the routers RT and the data management unit 24. The instruction memory 22 outputs the instructions INSTs including specific operations, such as types of operations, to the PEs 400 in accordance with execution of the operations by the PEs 400.

The data memory 23 has a plurality of storage areas for storing the data DT for use in convolutional operations. The data memory 23 stores the data DT supplied from the prefetch engine 300 through the routers RTs and the data management unit 24 and outputs the stored data DT in accordance with addresses provided from the address generation unit 21. Note that the data memory 23 is provided for every two PEs 400 arranged in the horizontal direction in FIG. 2. Thus, different addresses can be supplied to the respective data memories 23, and the data DT corresponding to the addresses can be output from the respective data memories 23.

The weight memory 25 has a plurality of storage areas for storing the weight W for use in convolutional operations. The weight memory 25 stores the weight W supplied from the prefetch engine 300 through the routers RTs and the data management unit 24 and outputs the stored weight W in accordance with addresses from the address generation unit 21. Note that the weight memory 25 is provided for every two PEs 400 arranged in the vertical direction in FIG. 2. Accordingly, different addresses can be supplied to the respective weight memories 25, and the weight W corresponding to the addresses can be output from the respective weight memories 25.

The output memory 26 has a plurality of storage areas for storing operational results from the PEs 400 such as feature maps. The output memory 26 is one example of a resultant memory for storing the operational results from the plurality of PEs 400. The output memory 26 outputs the operational results received from the PEs 400 contained in its own TPC 200 to the prefetch engine 300 through the data management unit 24. If the output memory 26 is provided for each TPC 200, transmissions of the operational results between the TPCs 200 are not required, and the transmission cycle of the operational results can be reduced. As a result, the efficiency of convolutional operations by the processor 100 can be improved.

The instruction memory 22, the data memory 23, the weight memory 25 and the reconfiguration control unit 28 are connected to the data management unit 24 via a transmission bus TB. Exemplary internal arrangements of the instruction memory 22, the data memory 23, the weight memory and the output memory 26 are described below with reference to FIG. 5.

The data management unit 24 manages transmissions of information such as data between the prefetch engine 300 and the TPCs 200. For example, the data management unit 24 forwards address information received from the prefetch engine 300 to the address generation unit 21 and forwards the instruction INST received from the prefetch engine 300 to the instruction memory 22. The data management unit 24 transmits data DT received from the prefetch engine 300 for use in convolutional operations to the data memories 23 and transmits the weight W received from the prefetch engine 300 for use in the convolutional operations to the weighted memory 25. The data management unit 24 outputs selection control information for the multiplexers 27 received from the prefetch engine 300 to the reconfiguration control unit 28.

Also, the data management unit 24 transmits operational results such as feature maps output from the output memory 26 to the prefetch engine 300. The data management unit 24 forwards the data DT stored in the data memory 23 to the data memory 23 in another TPC 200 through the routers RTs and forwards the weight W stored in the weight memory 25 to the weight memory 25 in another TPC 200 through the routers RTs.

For example, the data management unit 24 controls transmissions of the data DT between the data memories 23 in the its own TPC 200 and the data memories 23 in another TPC 200 during execution of convolutional operations based on instructions from the prefetch engine 300. Note that the data management unit 24 outputs identification information ID for identifying a destination entity of the information together with the information itself to the transmission bus TB. Each of the address generation unit 21, the instruction memory 22, the data memory 23, the weight memory 25 and the reconfiguration control unit 28, when the identification information ID transferred to the transmission bus TB indicates itself, receives the information transmitted together with the identification information ID. Namely, the address generation unit 21, the instruction memory 22, the data memory 23, the weight memory 25, the output memory 26 and the reconfiguration control unit 28 are identified by the identification information ID transmitted together with data itself via the routers RT.

Each reconfiguration control unit 28 (281, 282, 283) generates a selection signal for each multiplexer 27 (271, 272, 273, 274, 275) based on the selection control information output from the controller 310 via the data management unit 24. Each multiplexer 27 selects one of a plurality of inputs in accordance with the selection signal from reconfiguration control unit 28 and connects the selected input to its output.

The multiplexer 271 selects an instruction INST output from the instruction memory 22 in its own TPC 200, an instruction INST transmitted from the instruction memory (T) 22 in the upper TPC 200 or an instruction INST transmitted from the instruction memory (L) 22 in the left TPC 200. The instruction INST selected by the multiplexer 271 is output to an instruction input of the PE array of its own TPC 200 and is forwarded to the multiplexer 271 in the lower TPC (B) 200 via the transmission path of the instruction INST including latches LTs.

In its own TPC 200, the instruction INST supplied from the multiplexer 271 to the PE array is forwarded to the respective PEs 400 in the PE array. Also, the upper-right PE 400 in FIG. 2 forwards the instruction INST received from the left adjacent PE 400 to the right TPC (R) 200. The lower-right PE 400 in FIG. 2 performs various operations in response to the instruction INST but has no functionality to transmit the instruction INST to the right TPC (R) 200.

If the multiplexer 271 selects the output of the instruction memory 22 in its own TPC 200, the TPC 200 serves as the TPC 200 at the corner part which is the starting point of convolutional operations. In other words, the TPC 200 serving as the starting point for the convolutional operations is located on the upper left of a systolic array arranged with the PEs 400 of a predetermined number of TPCs 200. On the other hand, if the multiplexer 271 selects the INST instruction transmitted from the upper TPC (T) 200 or the left TPC (L) 200, the TPC 200 serves as one of the intermediate TPCs 200 other than the starting point.

The multiplexers 272 and 273 select either data DT output from the data memory 23 in its own TPC 200 or data DT transmitted from the left TPC (L) 200 and output the selected data DT to the data inputs of the PE array in the own TPC 200. In the PE array, the PEs 400 connected to the outputs of the multiplexers 272, 273 serves as the left end PEs 400 receiving the data DT from the data memories 23 or the intermediate PEs 400 receiving the data DT from the left TPC (L) 200. Here, the left PEs 400 indicate the left end PE 400 in a systolic array formed of PEs 400 of a predetermined number of TPCs 200, and the intermediate PE 400 indicates the PEs 400 other than the left end PE 400.

The multiplexers 274 and 275 select either the weight W output from the weight memory 25 in the own TPC 200 or the weight W output from the upper TPC (T) 200 and output the selected weight W to weight inputs of the PE array in the own TPC 200. In the PE array, the PEs 400 connected to the outputs of the multiplexers 274, 275 serves as the top end PEs 400 receiving the weight W from the weight memories 25 in the own TPC 200 or the intermediate PEs 400 receiving the weight W from the upper TPC (T) 200. Here, the top end PEs 400 indicate the top end PEs 400 of a systolic array formed of PEs 400 of a predetermined number of TPCs 200, and the intermediate PEs 400 indicate the PEs 400 other than the top end PEs 400.

Through the multiplexers 272 to 275, the PEs 400 contained in the plurality of TPCs 200 can be concatenated, and the size of the systolic array for use in convolutional operations can be arbitrarily set. Namely, the reconfiguration control units 281 to 283 and the multiplexers 271 to 275 can be used to reconfigure an optimal size of the systolic array in accordance with the amount of data DT for use in the convolutional operations.

Figure 3:
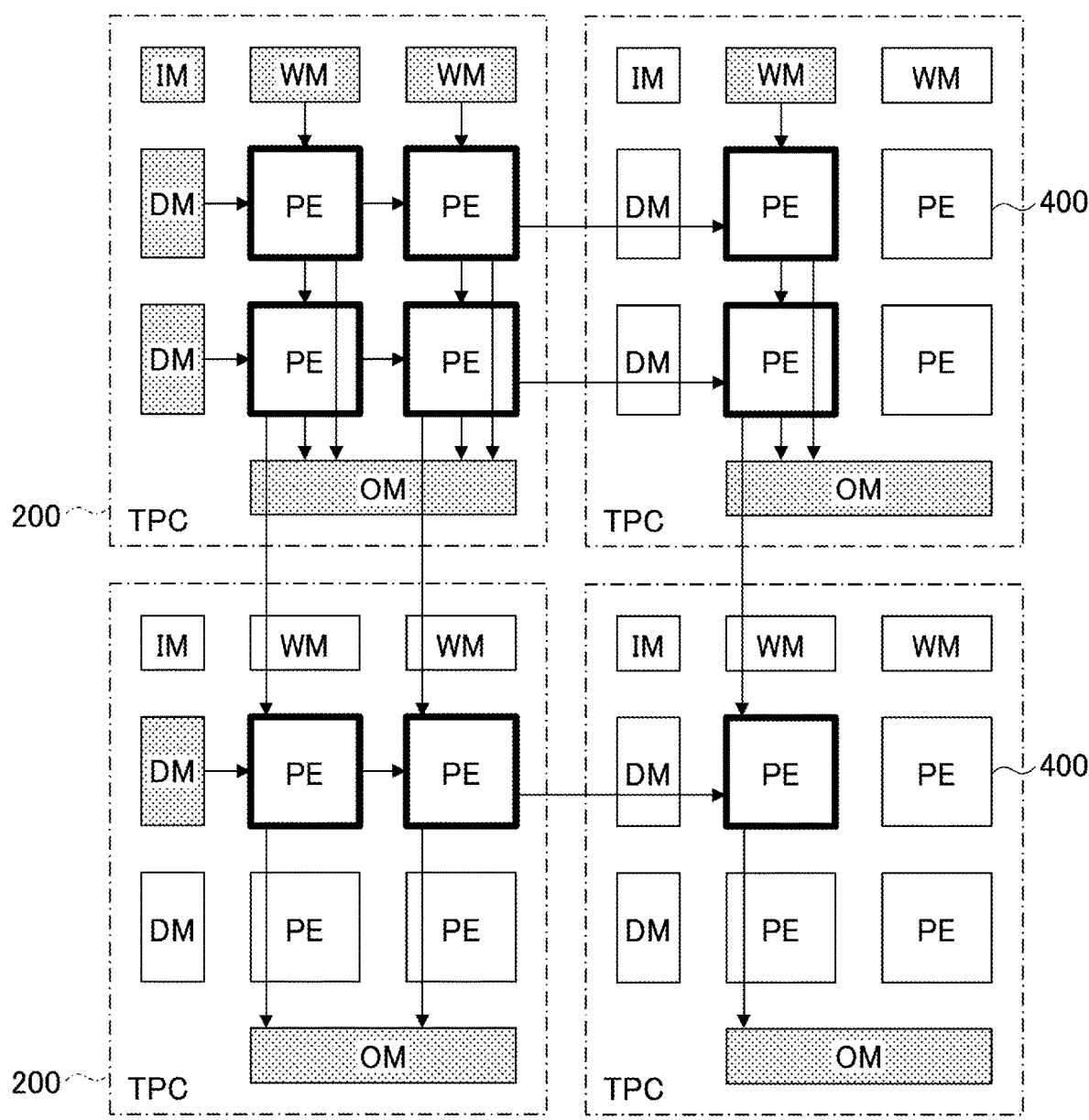
FIG. 3 is a block diagram for illustrating an arrangement of a systolic array according to one embodiment of the present disclosure.

FIG. 3 is a block diagram for illustrating one exemplary arrangement of a systolic array. In the example illustrated in FIG. 3, four TPCs 200 are used to configure the systolic array containing nine PEs 400 as illustrated with bold frames. The processor 100 uses the systolic array to perform deep learning (for example, convolutional operations) for a plurality of layers of a neural network. FIG. 3 illustrates the instruction memory 22, the data memories 23, the weight memories 25 and the output memory 26 as the instruction memories IMs, the data memories DMs, the weight memories WMs and the output memories OMs, respectively.

Several shaded portions indicate elements for use in convolutional operations performed in a systolic array. The outputs of the respective data memories DMs corresponding to the systolic array are sequentially connected to a predetermined number of horizontally aligned PEs in FIG. 3. The outputs of the respective weight memories WMs corresponding to the systolic array are sequentially connected to a predetermined number of vertically aligned PEs in FIG. 3.

The instruction INST is stored in the instruction memory IM in only the upper-left TPC 200 in the systolic array. The data DT for use in the convolutional operations is stored in the data memories DM of the left TPCs 200 in the systolic array. The weight W for use in the convolutional operations is stored in the weight memories WM in the upper TPCs 200 in the systolic array. Feature maps generated by the respective PEs 400 in the convolutional operations are stored in the output memories OMs of the TPCs 200 which the respective PEs belong to.

Note that if all the (sixteen) PEs 400 in the four TPCs 200 are used for the convolutional operations, the data DT is also stored in the lower data memory DM in the lower-left TPC 200 in FIG. 3, and the weight W is stored in the right weight memory WM in the upper-right TPC 200 in FIG. 3.

Figure 4:
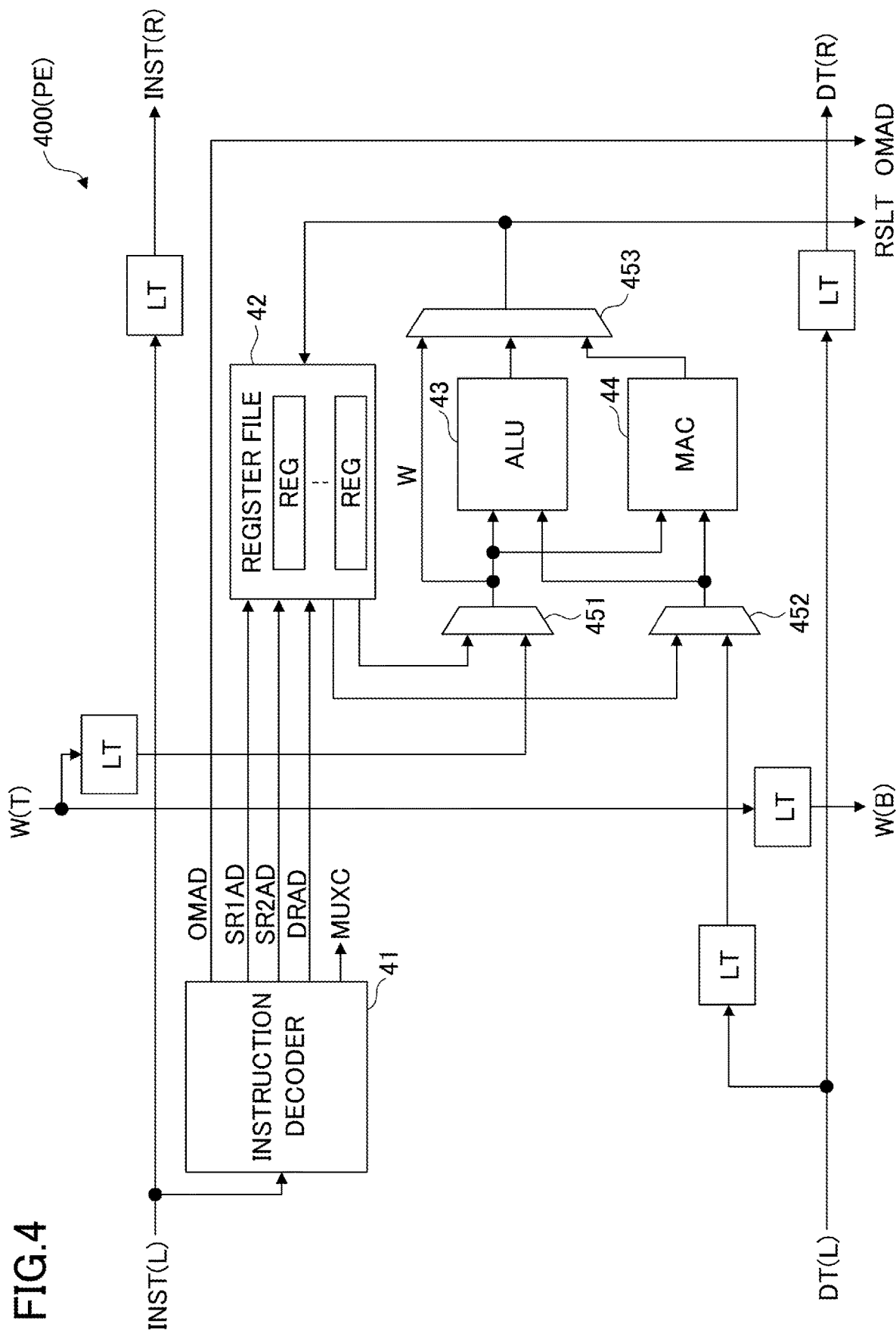
FIG. 4 is a circuit diagram for illustrating a processing element in FIG. 2 according to one embodiment of the present disclosure.

FIG. 4 is a circuit diagram for illustrating one exemplary arrangement of the processing element 400 in FIG. 2. The PE 400 has an instruction decoder 41, a register file 42, an ALU (Arithmetic and Logic Unit) 43, a MAC (Multiply and Accumulate) 44, multiplexers 45 (451, 452, 453) and a plurality of latches LTs. Namely, the PE 400 includes an arithmetic operator (ALU) and a product sum operator (MAC).

The instruction decoder 41 decodes the instruction INST to generate an output memory address OMAD, source register addresses SR1AD and SR2AD, a distribution register address DRAD and a multiplexer control signal MUXC. The multiplexer control signal MUXC is generated for each of the multiplexers 451, 452, 453.

The output memory address OMAD indicates a destination storage in the output memory 26 for storing a feature map or the like. For example, the source register addresses SR1AD and SR2AD indicate registers REGs to store data such as the weight W for use in various operations, and the destination register address DRAD indicates a register REG to store operational results. The multiplexer control signal MUXC is output to the respective multiplexers 451, 452, 453 and is used to switch the multiplexers 451, 452, 453.

The register file 42 includes a plurality of registers REGs, similar to a general purpose processor such as a CPU (Central Processing Unit). For example, the multiple registers REGs specified in the instruction may store the weight W or the data DT for use in convolutional operations, and operational results RSLTs may be stored. Note that the register file 42 may have a register REG for fixed-point numbers and a register REG for floating-point numbers.

For example, the ALU 43 may perform one or more of addition, subtraction, multiplication, left shift, right shift, minimum value calculation, maximum value calculation, AND, OR or XOR based on the instruction INST (decoded result) decoded by the instruction decoder 41. The types of operations that can be performed by the ALU 43 are not limited to the above. For example, the ALU 43 may calculate a 32-bit floating-point number. The MAC 44 performs product sum operations on 16-bit or 32-bit floating point numbers based on the instruction INST decoded by instruction decoder 41. The number of bits that can be processed by the MAC 44 is not limited to the above and may be 8 bits. The plurality of MACs 44 may also be mounted to each PE 400. In this manner, the PE 400 has multiple types of arithmetic elements and register files 42 and accordingly can perform operations similar to CPUs.

The multiplexer 451, in response to the multiplexer control signal MUXC, outputs either the weight W stored in the register REG or the weight W received from the upper side (T) to the ALU 43 or the MAC 44. The multiplexer 452, in response to the multiplexer control signal MUXC, outputs either the data DT stored in the register REG or the data DT received from the left side to the ALU 43 or the MAC 44.

The multiplexer 453 outputs any of operational results RSLTs received from either the ALU 43 or the MAC 44 to the register file 42 or the output memory 26 (FIG. 2) in accordance with the multiplexer control signal MUXC. It should be noted that a destination storage in the output memory 26 for the operational results RSLTs is specified by the output memory address OMAD. Also, the multiplexer 453 stores the weight W bypassed from the multiplexer 451 in any of the registers REGs of the register file 42 in accordance with the multiplexer control signal MUXC.

In the PE 400, the instruction INST and the data DT can be transferred from the left side (L) to the right side (R) in FIG. 4 via the latches LTs, and the weight W can be transferred from the upper side (T) to the lower side (B) in FIG. 4 via the latches LTs.

The PE 400 as illustrated in FIG. 4 has the ALU 43, the MAC 44 and the register file 42 instead of the multiplier. As a result, for example, the PE 400 can perform various arithmetic and logical operations as well as multiplication in convolutional operations. For example, this makes the PE 400 available to operations for not only a convolution layer but also a pooling layer, an activating layer, a fully-connected layer and the like in deep learning on neural networks. Further, the convolutional operations to accumulate multiplications of the data DT and the weight W can be performed in the PE 400.

Furthermore, the PE 400 can use operational results stored in the register REG to perform other operations. Also, since the weight W supplied from the outside can be bypassed to the register REG, the weight W stored in the register REG can be repeatedly used to perform the convolutional operations. As a result, for example, the number of transmission times of the data DT to the data memory 23 and the number of transmission times of the weight W to the weight memory 25 can be reduced compared to conventional schemes, and the systolic array can be used to perform the convolutional operation efficiently.

Figure 5:
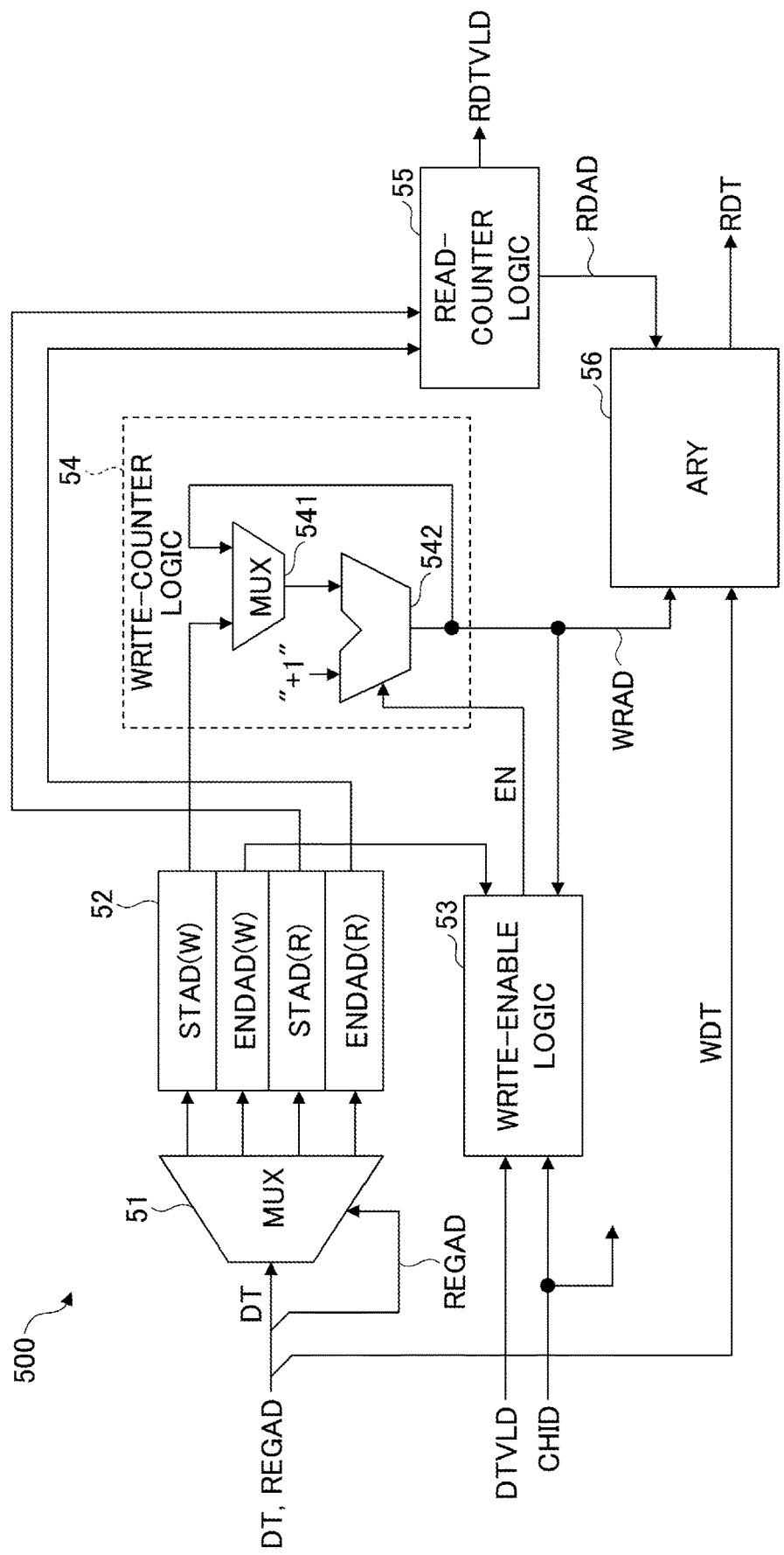
FIG. 5 is a block diagram for illustrating various memories in FIG. 2 according to one embodiment of the present disclosure.

FIG. 5 is a block diagram for illustrating various exemplary types of memories in FIG. 2. The memory 500 as illustrated in FIG. 5 is any of the instruction memory 22, the data memory 23, the weight memory 25 and the output memory 26.

The memory 500 includes a multiplexer 51, a register 52, a write-enable logic 53, a write-counter logic 54, a read-counter logic 55 and a memory array 56 (ARY). If identification information ID received through the transmission bus TB indicates its own memory 500 and the data includes information to configure the register 52, the multiplexer 51 stores an address included in the data in the predetermined register 52. The register 52 has an area for storing a start address STAD (W) for writing, an end address ENDAD (W) for writing, a start address STAD (R) for reading and an end address ENDAD (R) for reading. A storage location in register 52 is identified by a register address REGAD included in the data.

When the identification information ID indicates its own memory 500 and a data valid signal DTVLD indicates a valid state of written data, the write-enable logic 53 operates. The write-enable logic 53 outputs an enable signal EN until a write address WRAD output from the write-counter logic 54 reaches the end address ENDAD (W). The write-counter logic 54 includes a multiplexer 541 and an adder 542. The multiplexer 541 selects the start address STAD (W) at the start of writing data to a memory array ARY and then selects the write address WRAD output by the adder 542. The adder 542 operates during reception of the enable signal EN and increments the write address output from multiplexer 541 by "+1" to generate the write address WRAD.

The read-counter logic 55 sequentially generates the read addresses RDADs from the start address STAD(R) to the end address ENDAD(R), which are set in the register 52. The read-counter logic 55 generates a read data valid signal RDTVLD while generating a valid read address RDAD. The read data valid signal RDTVLD indicates that the read data RDT from the memory array ARY is valid.

The memory array ARY writes the write data WDT received together with the write address WRAD to a memory cell (not shown) and reads data from a memory cell indicated by the read address RDAD to output the data as read data RDT. The write data WDT and the read data RDT are input data DT, weight data W, an operational result RSLT or an instruction INST. For example, the memory array ARY has a memory capacity of, but not limited to, a few kilowords. For example, one word contains identification information ID of 5 bits and data of 64 bits. The number of bits of the identification information ID may be increased or decreased in accordance with the number of elements requiring identification. The data may be of 32 bits or 128 bits.

Figure 6:
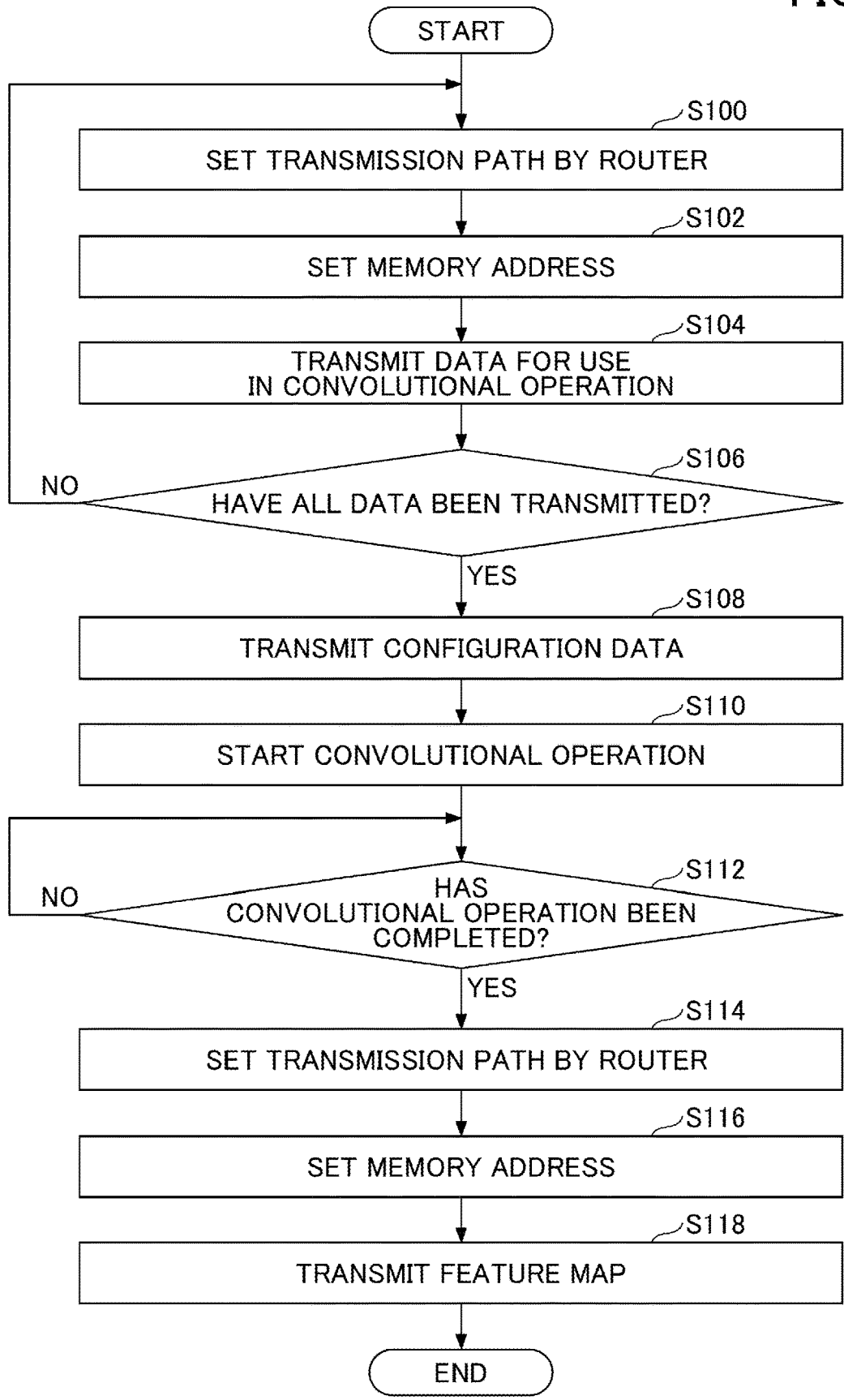
FIG. 6 is a flowchart for illustrating convolutional operations executed by the processor in FIG. 1 according to one embodiment of the present disclosure.

FIG. 6 is a flowchart for illustrating one exemplary convolutional operation performed by the processor 100 in FIG. 1. Namely, FIG. 6 illustrates one exemplary control method for the processor 100. The operational flow as illustrated in FIG. 6 is initiated, for example, in response to an instruction for the convolutional operation from an upper system for controlling operations of the processor 100. When a plurality of convolutional operation instructions are received from the upper system, the processor 100 may repeatedly execute the operational flow shown in FIG. 6.

By repeating the steps S100, S102, S104 and S106, transmissions of address generation information to the address generation unit 21, transmissions of the data DT to the data memory 23, transmissions of the weight W to the weight memory 25 and transmissions of the instruction INST to the instruction memory 22 are sequentially performed. Hereinafter, the address generation information, the instruction INST, the data DT and the weight W may be also collectively referred to as data. The data transmissions at the steps S100, S102, S104 and S106 are performed for each the vertically aligned TPCs 200 in FIG. 1 (every three TPCs 200 in the example in FIG. 1). In other words, the data can be transferred in parallel to the vertically aligned TPCs 200 in FIG. 1.

At step S100, the controller 310 in the processor 100 reconfigures routers RTs for a NOC to configure a data transmission path. If the TPC 200 receiving data to be transmitted is unchanged, step S100 may be omitted after the second and subsequent iterations, and the previously configured data transmission path may be used. Regardless of the configuration of the data transmission path, the controller 310 may output a control signal to any TPC 200.

Next, at step S102, the controller 310 configures a memory address destined for data for the instruction memory 22, the data memory 23 or the weight memory 25. Here, the memory address is an address allocated to the instruction memory 22, the data memory 23 or the weight memory 25, which may be the transmission destination of the data, and may be the address STAD (W) or the address ENDAD (W) for writing as illustrated in FIG. 5. The controller 310 outputs the memory address and a register address REGAD to the NOC along with the identification information ID indicative of the destination of the data. For example, upon receiving the addresses STAD (W) and ENDAD (W), the data memory 23 stores the received addresses STAD (W) and ENDAD (W) in an area in the register 52 indicated by the register address REGAD.

Next, at step S104, the controller 310 sequentially outputs data (the data DT, the weight W or the instruction INST) for use in convolutional operations together with the identification information ID to the NOC. The data management unit 24 in the TPC 200, to which the data is to be transmitted, outputs the data received via the NOC to the transmission bus TB. Upon receiving the data DT from the controller 310 via the transmission bus TB, the data memory 23 may operate as follows. For every reception of the data DT of one word, the data memory 23 sequentially stores the data DT in the memory array ARY while changing the storage destination from the start address STAD (W) to the end address ENDAD (W). Also, if the address generation information is transmitted to the address generation unit 21, the controller 310 outputs the address generation information together with the identification information ID.

Next, at step S106, the processor 100 determines whether all the data required for the convolutional operations has been transferred and repeats step S100 to step S104 until all the data required for the convolutional operations has been transferred. When all the data required for the convolutional operations has been transferred, at step S108, the processor 100 outputs selection control information for configuration together with the identification information ID to the reconfiguration control unit 28. The selection control information is output for each of vertically aligned TPCs 200 in FIG. 1. Upon receiving the selection control information, the reconfiguration control unit 28 switches the multiplexer 27 to arrange a systolic array of a predetermined size.

Next, at step S110, the controller 310 outputs a trigger signal for initiating the convolutional operations to the TPC 200 including the instruction memory 22 storing the instruction INST. In response to the trigger signal, instructions are sequentially output from the instruction memory 22, and addresses for the data memory 23 and the weight memory 25 are sequentially output by the address generation unit 21 to initiate the convolutional operation. Feature maps, which are results of the convolutional operations, are stored in the output memory 26. At step S112, the controller 310 waits for completion of the convolutional operations.

When the convolutional operations have been completed, at step S114, the controller 310 controls the routers RTs to configure the data transmission path to forward the feature maps obtained as a result of the convolutional operations. Next, at step S116, the controller 310 configures the memory addresses of the transmission sources of the feature maps for the output memory 26 having the feature maps stored. Here, the memory addresses are the addresses STAD(R) and ENDAD(R) for reading as illustrated in FIG. 5. At step S118, the controller 310 issues a transfer request to the output memory 26, sequentially receives data of the feature map output from the output memory 26 every one word at a time and terminates the convolutional operations using the systolic array.

Figure 7:
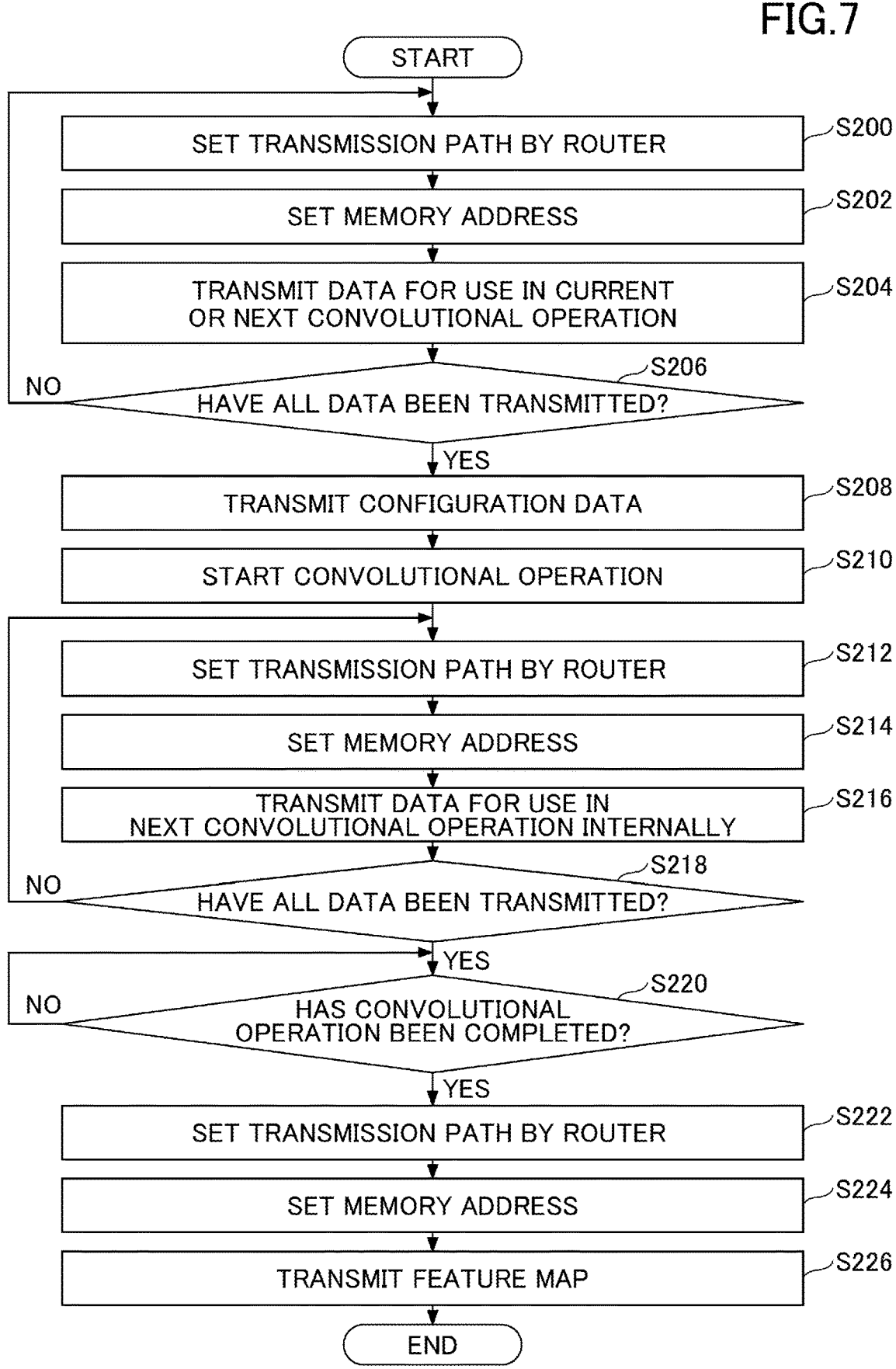
FIG. 7 is another flowchart for illustrating convolutional operations executed by the processor in FIG. 1 according to one embodiment of the present disclosure.

FIG. 7 is another flowchart for illustrating convolutional operations performed by the processor 100 in FIG. 1. Namely, FIG. 7 illustrates another exemplary control method for the processor 100. In FIG. 7, the data DT and the weight W processed in the next convolutional operation are stored in the unused data memory 23 and the unused weight memory 25, respectively, which are not used in the convolutional operation at the systolic array. During the convolutional operation, the data DT and the weight W are transmitted from the data memory 23 and the weight memory 25 having the data DT and the weight W stored for the next convolutional operation to the data memory 23 and the weight memory 25 corresponding to the systolic array.

For example, there may be some cases where the amounts of data DT and weight W for use in the convolution process may be large and as a result, the data DT and the weight W cannot be accommodated in the data memory 23 located at the left end of the systolic array and the weight memory 25 located at the upper end of the systolic array, respectively. In these cases, the unused data memory 23 and the unused weight memory 25 in the systolic array may be used to transmit the data DT and the weight W from the prefetch engine 300 to the systolic array prior to starting the convolutional operation. By transmitting the data DT and the weight W in advance to the unused data memory 23 and the unused weight memory 25, respectively, even if the amounts of data DT and weight W are large, the transmission of the data DT and the weight W from the outside and the convolutional operation can be performed without separation. As a result, the efficiency of the convolutional operations can be improved.

If only the data DT cannot be accommodated in the left end data memory 23 in the systolic array, only the data DT is transmitted from the unused data memory 23, and the weight W is not transmitted from the unused weight memory 25. Likewise, if only the weight W cannot be accommodated in the upper end weight memory 25 in the systolic array, only the weight W is transmitted from the unused weight memory 25, and the data DT is not transmitted from the unused data memory 23.

Steps S200, S202, S204 and S206 are similar to steps S100, S102, S104 and S106 in FIG. 6 except that the data is transmitted to the unused data memory 23 and the unused weight memory 25. Steps S208 and S210 are the same as steps S108 and S110 in FIG. 6.

After the convolutional operation starts, at steps S212 to S218, the controller 310 transmits the data DT between the data memories 23 and the weight W between the weight memories 25. Namely, the data DT and the weight W for use in the next convolutional operation are transmitted from the data memory 23 and the weight memory 25 having the data DT and the weight W stored, respectively, to the data memory 23 and the weight memory 25 corresponding to the systolic array.

First, at step S212, the controller 310 controls the routers RTs to configure a data transmission path between the source TPC 200 and the destination TPC 200. Next, at step S214, the controller 310 configures addresses STAD(R) and ENDAD(R) for reading from the source TPC 200 and addresses STAD(W) and ENDAD(W) for writing to the destination TPC 200. Here, the data source and the data destination are the data memory 23 or the weight memory 25.

Next, at step S216, the controller 310 instructs the source TPC 200 and the destination TPC 200 to transmit the data. For example, upon receiving the instruction, the data management unit 24 of the TPC 200 manages the transfer of data from the data memory 23 in the data source to the data memory 23 in the data destination. As illustrated in FIG. 1, the processor 100 has a NOC for interconnecting a plurality of TPCs 200 each other and can transfer the data DT from the data memory 23 in one TPC 200 to the data memory 23 in another TPC 200. Also, the weight W can be transferred from the weight memory 25 in one TPC 200 to the weight memory 25 in another TPC 200. Accordingly, regardless of the size of the systolic array formed at step S208, the data DT can be transferred between the data memories 23 included in the systolic array, and the weight W can be transferred between the weighted memories 25 included in the systolic array.

Next, at step S218, the processor 100 determines whether all the data (the data DT and the weight W) required for the next convolutional operation has been transferred and repeats steps S216 to S212 until all the data required for the next convolutional operation has been transferred. If all the data required for the next convolutional operation has been transferred, at step S220, the processor 100 waits for completion of the convolutional operation. Since it takes a longer time to perform the convolutional operation than the data transferring, the data for use in the next convolutional operation may be transferred during execution of the convolutional operation.

Steps S222, S224 and S226 are similar to steps S114, S116 and S118 in FIG. 6. For example, after step S226, the flow may proceed to step S110 in FIG. 6, and the next convolutional operation may be performed. Alternatively, the flow may proceed to step S210, and the next convolutional operation may be performed. In the operations as illustrated in FIG. 7, the data for use in the next convolutional operation is transferred to the data memory 23 and the weight memory 25 during the convolutional operation. As a result, the next convolutional operation can be initiated immediately after completion of the current convolutional operation, and the efficiency of convolutional operations can be improved.

Figure 8:
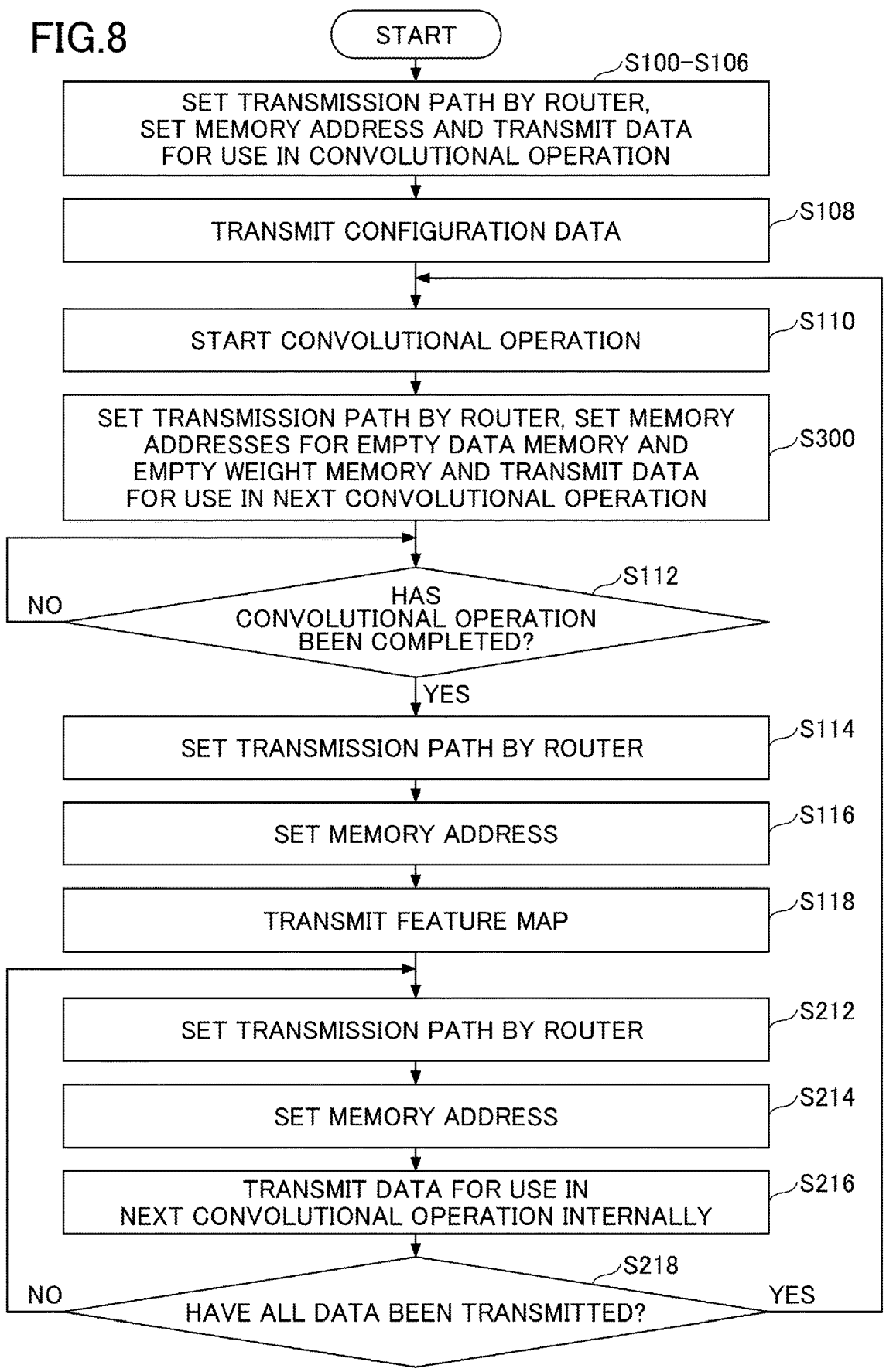
FIG. 8 is a still further flowchart for illustrating convolutional operations executed by the processor in FIG. 1 according to one embodiment of the present disclosure.

FIG. 8 is a still further flowchart for illustrating convolutional operations by the processor 100 in FIG. 1. Namely, FIG. 8 illustrates one exemplary control method for the processor 100. In FIG. 8, after execution of step S100 to S110 in FIG. 6, at step S300, data for use in the next convolutional operation is transmitted from the controller 310 to the unused data memory 23 and the unused weight memory 25 via the NOC. Step S300 is similar to steps S100 to S106 in FIG. 6 except that the data destination is the unused data memory 23 and the unused weight memory 25 that do not correspond to a systolic array.

After step S300, a feature map is transmitted as in step S112 to S118 in FIG. 6. Then, after step S118, similar to steps S212 to S218 in FIG. 7, data is transferred between TPCs 200, and data for use in the next convolutional operation is transferred to the data memory 23 and the weight memory 25 corresponding to the systolic array, respectively. After the data for use in the next convolutional operation has been transferred, the flow returns to step S110, and the next convolutional operation is initiated. Subsequently, steps S110, S300, S112-S118 and S212-S218 are repeated a predetermined number of times.

Also in FIG. 8, the data for use in the next convolutional operation is transmitted to the data memory 23 and the weight memory 25 during the convolutional operation. As a result, the next convolutional operation can be initiated immediately after completion of the convolutional operation, and the efficiency of the convolutional operations can be improved.

FIGS. 9 to 16 are explanation drawings for illustrating a flow of data transmission as described in conjunction with FIG. 7. Namely, FIGS. 9 to 16 illustrate one exemplary control method for the processor 100. Similar to FIG. 3, FIGS. 9 to 16 illustrate one example where nine PEs 400 included in 2×2 TPCs 200 are used as a systolic array. Hereinafter, the upper left TPC 200 may be referred to as the TPC (00), and the upper right TPC 200 may be referred to as the TPC (01). Also, the lower left TPC 200 may be referred to as the TPC (10), and the lower right TPC 200 is referred to as the TPC (11).

Similar to FIG. 3, the instruction memory 22, the data memory 23, the weight memory 25 and the output memory 25 are indicated as the instruction memory IM, the data memory DM, the weight memory WM and the output memory OM, respectively. Also, the PE 400 is referred to as the PE. The shaded portions illustrate the instruction memory IM, the data memory DM, the weight memory WM and the output memory OM for use in convolutional operations, and slant line portions illustrate the data memory DM, the weight memory WM and the output memory OM for storing data or the like for use in the next convolutional operation. The PEs illustrated in bold frames indicate that they are included in a systolic array, and the routers RTs illustrated in bold frames indicate that they are put on a transmission path to be reconfigured.

Figure 9:
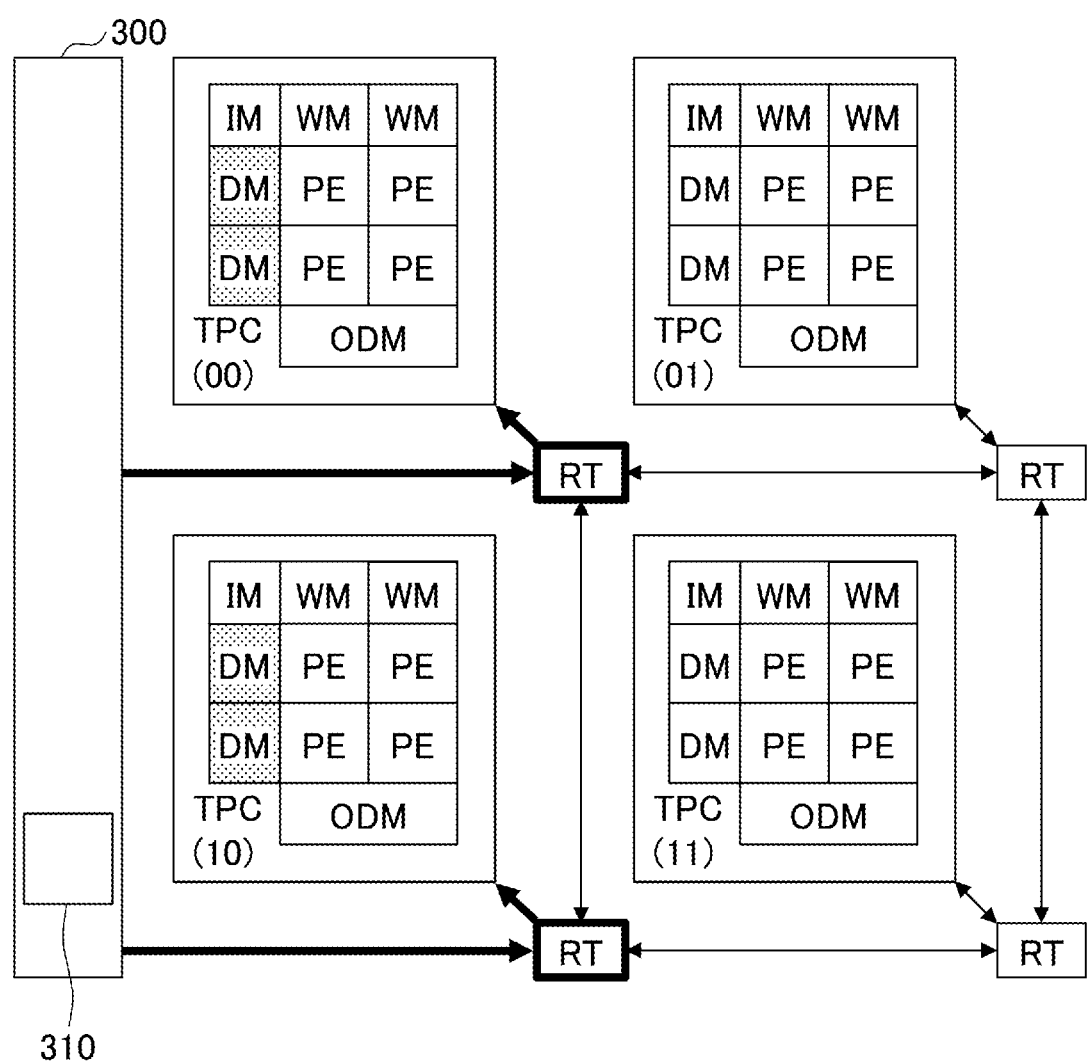
FIG. 9 is a drawing for illustrating a flow of data transmissions described in conjunction with FIGS. 6 to 8 according to one embodiment of the present disclosure.

In FIG. 9, the controller 310 reconfigures the routers RTs to configure the data transmission path from the prefetch engine 300 to the TPCs (00) and (10). Also, the controller 310 configures addresses STAD(W) and ENDAD(W) for writing in the data memories DMs in the TPCs (00) and (10). Then, the controller 310 transfers the data DT for use in convolutional operations to the TPCs (00) and (10).

Figure 10:
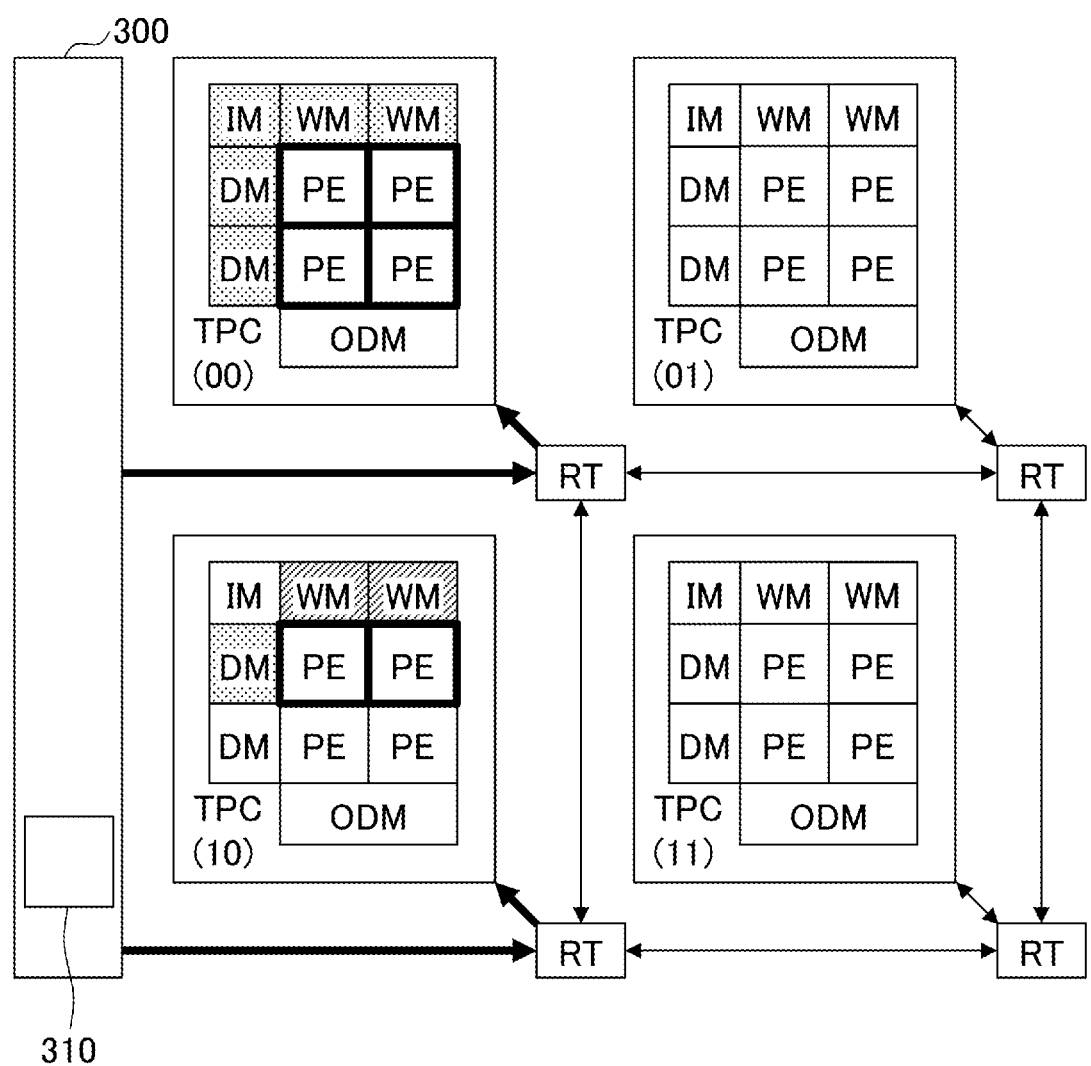
FIG. 10 is another drawing for illustrating the flow of data transmissions described in conjunction with according to one embodiment of the present disclosure.

Next, in FIG. 10, the controller 310 configures the addresses STAD(W) and ENDAD(W) for writing in the weight memory 25 in the TPC (00) while retaining the transmission path and transmits the weight W for use in the convolutional operations. Also, the controller 310 configures the addresses STAD(W) and ENDAD(W) for writing in the weight memory 25 in the TPC (10) and transmits the weight W for use in the next convolutional operation.

In addition, the controller 310 transmits the instruction INST for use in the convolution operations to the instruction memory 22 in the TPC (00). The instruction INST is transferred only to the instruction memory 22 corresponding to the upper left portion in the systolic array. In this embodiment, the instruction INST may not be stored in all the instruction memories 22 included in the TPCs 200 composing the systolic array, so that the transfer efficiency of the instruction INST from the controller 310 to the instruction memory 22 can be improved. Hereinafter, the addresses STAD (W) and ENDAD (W) for writing may not be configured for omission. The weight W for use in the next convolutional operation may be transmitted to the weight memories 25 in the TPCs 200 other than the TPCs 200 including PEs composing the systolic array.

Also, in FIG. 10, the controller 310 outputs selection control information to the TPCs (00) and (10) to cause the reconfiguration control units 281, 282 and 283 to reconfigure the multiplexers 271, 272, 273, 274 and 275. In this manner, in the TPC (00) and (10), the PEs indicated in the bold frames can configure a portion of the systolic array for use in the convolutional operations. Namely, in response to receiving the data DT, the weight W and the instruction INST from the data memory DM, the weight memory WM and the instruction memory IM in the TPC (00), the PEs in the TPC (00) indicated in the bold frames can perform the convolutional operation. Also, in response to receiving the data DT from the data memory DM in the TPC (10) and the weight W and the instruction INST from the weight memory WM and the instruction memory IM in the TPC (00), the PEs in the TPC (10) indicated in the bold frames can perform the convolutional operation.

Figure 11:
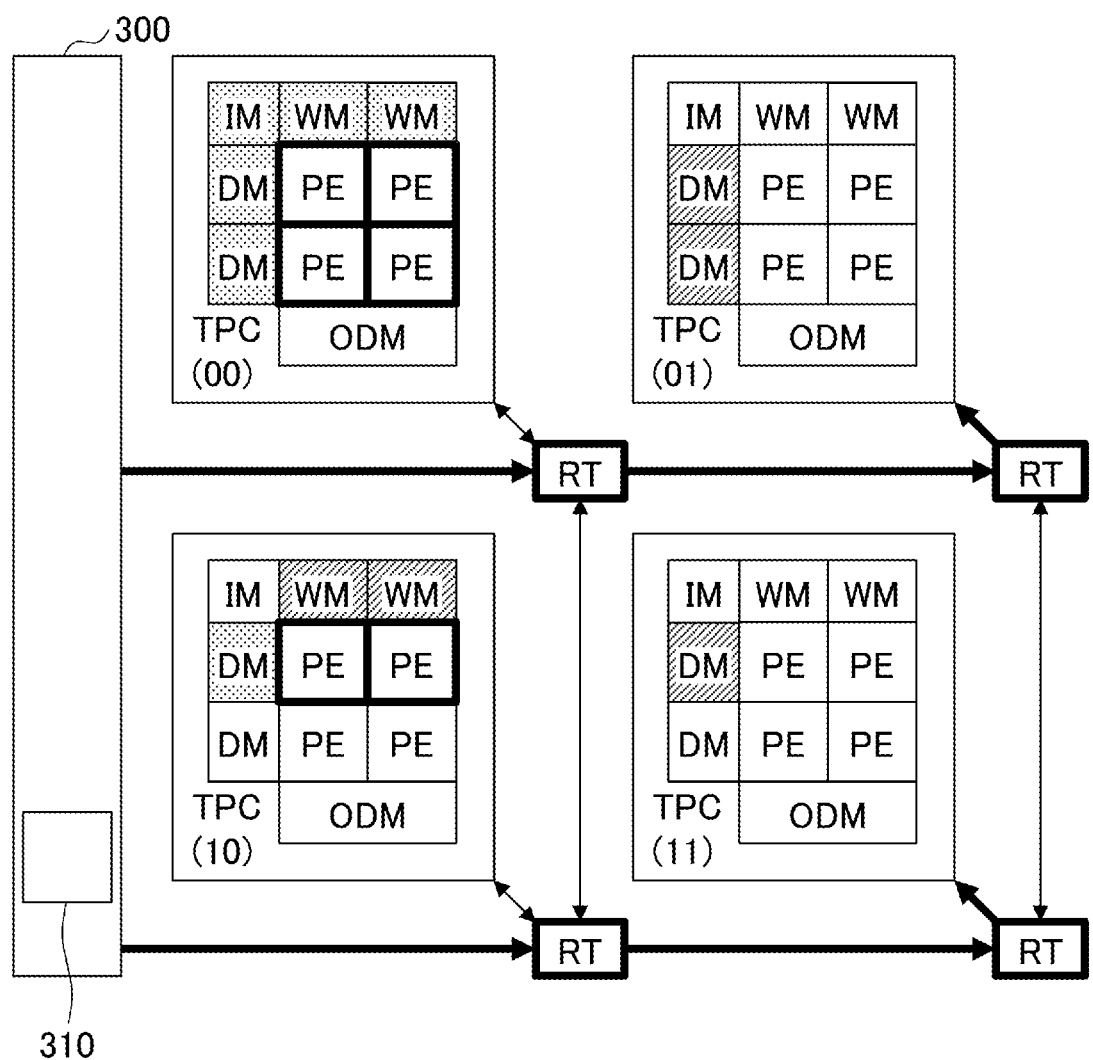
FIG. 11 is another drawing for illustrating the flow of data transmissions described in conjunction with according to one embodiment of the present disclosure.

Next, in FIG. 11, the controller 310 reconfigures the routers RTs from the prefetch engine 300 to configure a data transmission path for the TPCs (01) and (11). Then, the controller 310 transmits the data DT for use in the next convolutional operation to the data memories DM in the TPCs (01) and (11). Note that the data DT for use in the next convolutional operation may be transmitted to the data memories 23 in the TPCs 200 other than the TPCs 200 including the PEs composing the systolic array.

Figure 12:
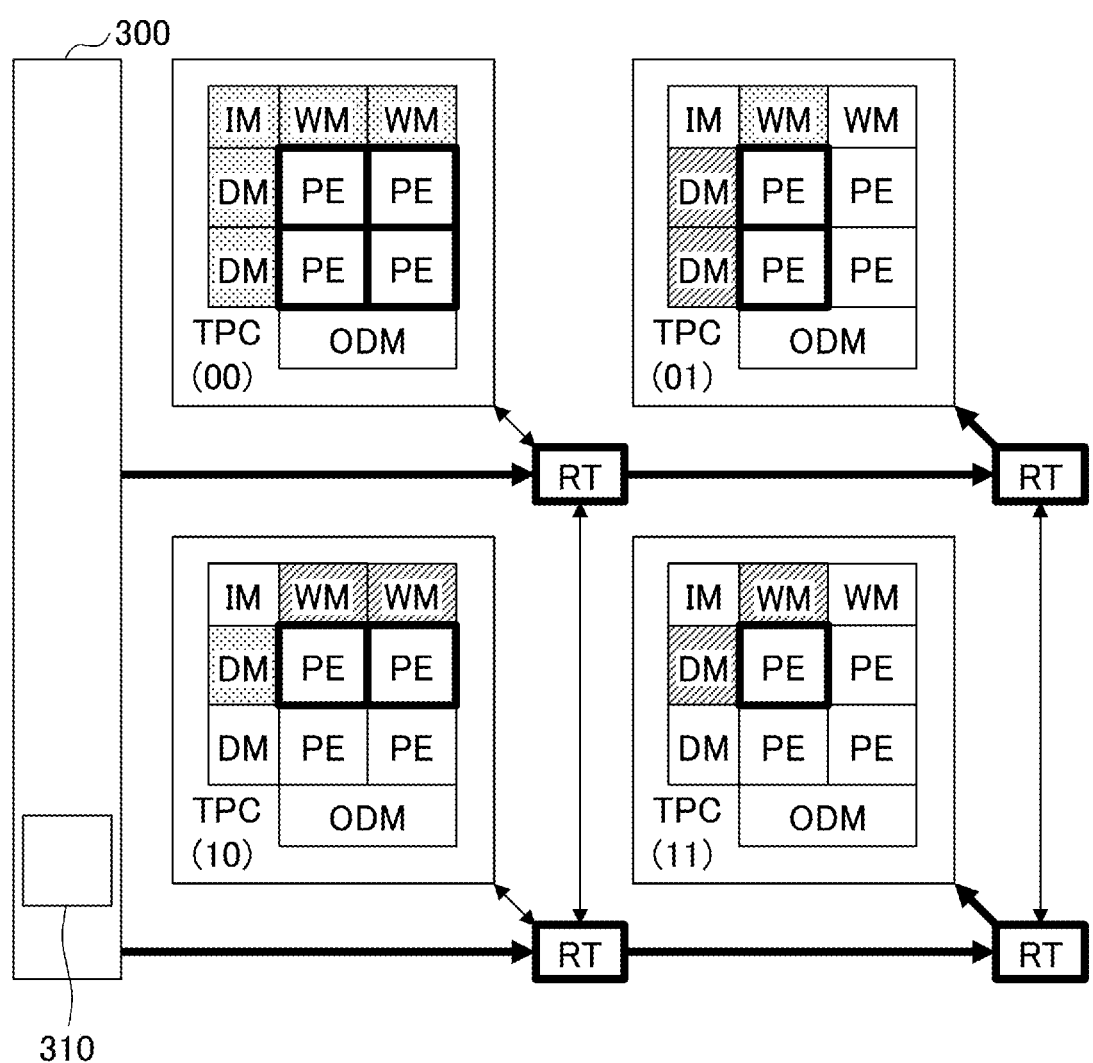
FIG. 12 is another drawing for illustrating the flow of data transmissions described in conjunction with according to one embodiment of the present disclosure.

Next, in FIG. 12, the controller 310 transmits the weight W for use in the current convolutional operation to the weight memory 25 in the TPC (01) and the weight W for use in the next convolutional operation to the weight memory 25 in the TPC (11) while retaining the data transmission path. Also in FIG. 12, the controller 310 outputs the selection control information to the TPCs (01) and (11) to cause the reconfiguration control units 281, 282 and 283 to reconfigure the multiplexers 271, 272, 273, 274 and 275. In this manner, in the TPCs (01) and (11), the PEs indicated in the bold frames can configure a portion of the systolic array for use in the convolutional operation. Then, similar to FIG. 3, the systolic array including nine PEs for use in the convolutional operation can be formed.

In response to receiving the data DT and the instruction INST from the data memory DM and the instruction memory IM in the TPC (00), the PEs in the TPC (01) indicated in the bold frames perform the convolutional operation. In response to receiving the data DT from the data memory DM in the TPC (10) and the instruction INST from the instruction memory IM in the TPC (00), the PEs in the TPC (11) indicated in the bold frames perform the convolutional operation. After that, the TPCs (00), (01), (10) and (11) initiate the convolutional operation based on an instruction from the controller 310.

Figure 13:
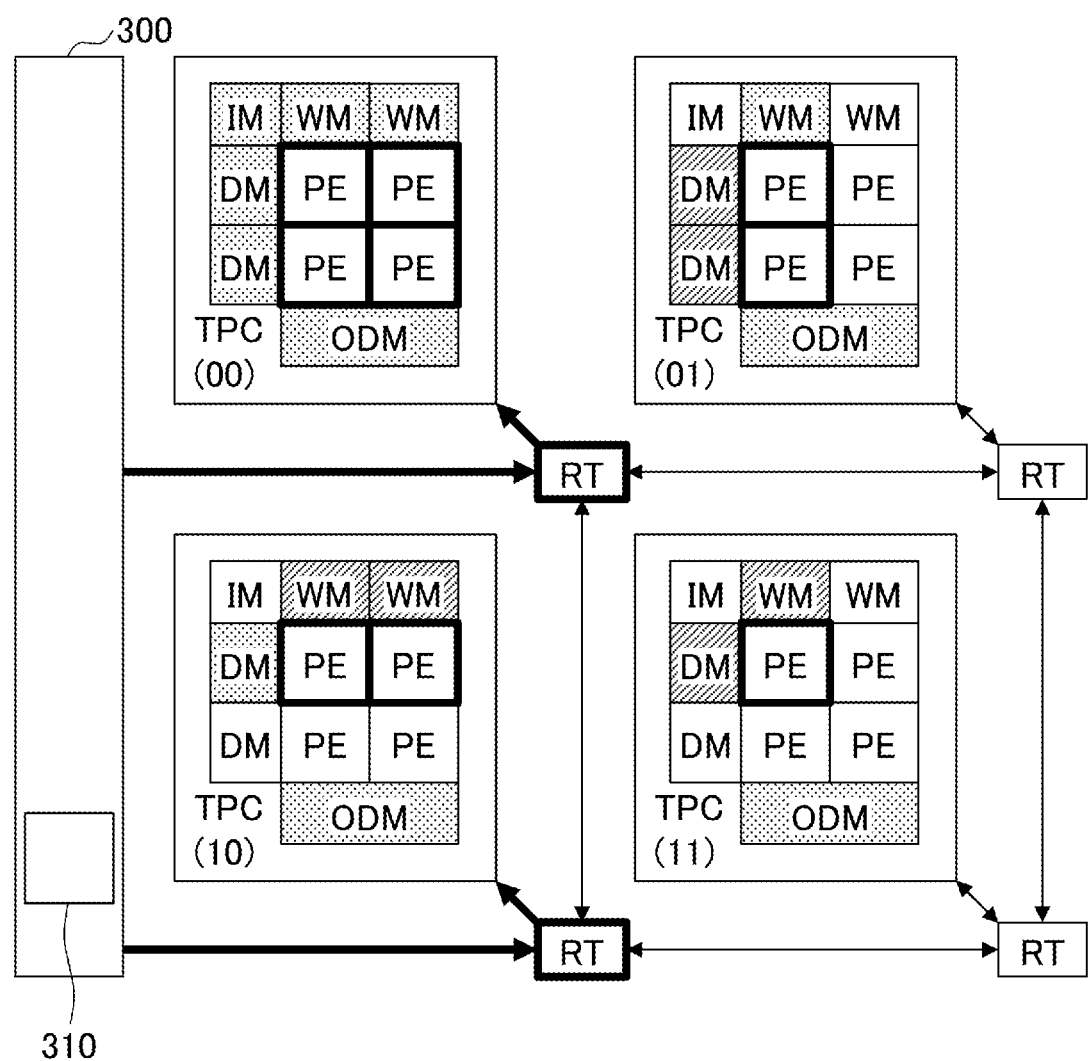
FIG. 13 is another drawing for illustrating the flow of data transmissions described in conjunction with according to one embodiment of the present disclosure.

Next, in FIG. 13, the controller 310 reconfigures the routers RTs to configure the data transmission path as a path destined from the prefetch engine 300 to the TPCs (00) and (10). Also, the controller 310 configures addresses STAD (W) and ENDAD (W) for writing for the data memories DMs in the TPCs (00) and (10). Although the illustration is omitted, the controller 310 then reconfigures the routers RTs to configure the data transmission path as a path destined from the prefetch engine 300 to the TPCs (01) and (11). Then, the controller 310 configures the addresses STAD (R) and ENDAD (R) for reading for the data memories DMs in the TPCs (01) and (11). Note that feature maps obtained in the convolutional operations are sequentially stored in the output memory OM.

Figure 14:
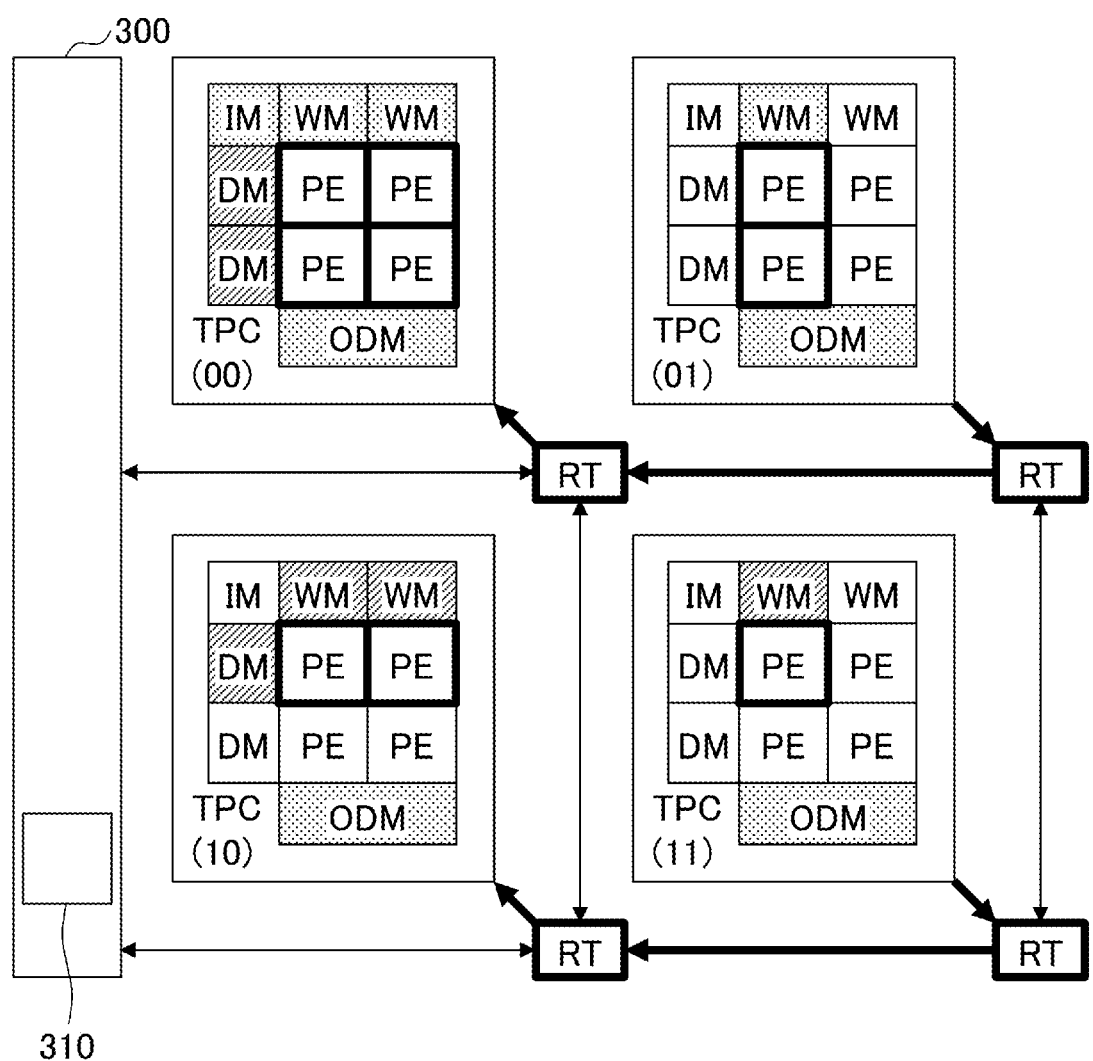
FIG. 14 is another drawing for illustrating the flow of data transmissions described in conjunction with according to one embodiment of the present disclosure.

Next, in FIG. 14, the controller 310 changes the data transmission path to transmit the data for use in the next convolutional operation, which is stored in the TPCs (01) and (11), to the TPCs (00) and (10). Namely, the controller 310 reconfigures the routers RTs to configure the data transmission path as a path destined from the TPCs (01) and (11) to the TPCs (00) and (10). Then, the controller 310 outputs a trigger signal for instructing the TPCs (01) and (11) to transmit the data DT and causes the data DT for use in the next convolutional operation to be transmitted from the TPCs (01) and (11) to the TPCs (00) and (10), as illustrated in the slanted lines.

In this manner, as illustrated in conjunction with FIG. 7, even if a large amount of data is used in the convolutional operations, the data DT and the weight W transmitted to the TPCs beforehand can be transferred among the TPCs during the convolutional operations, and the efficiency of the convolutional operations can be improved.

Figure 15:
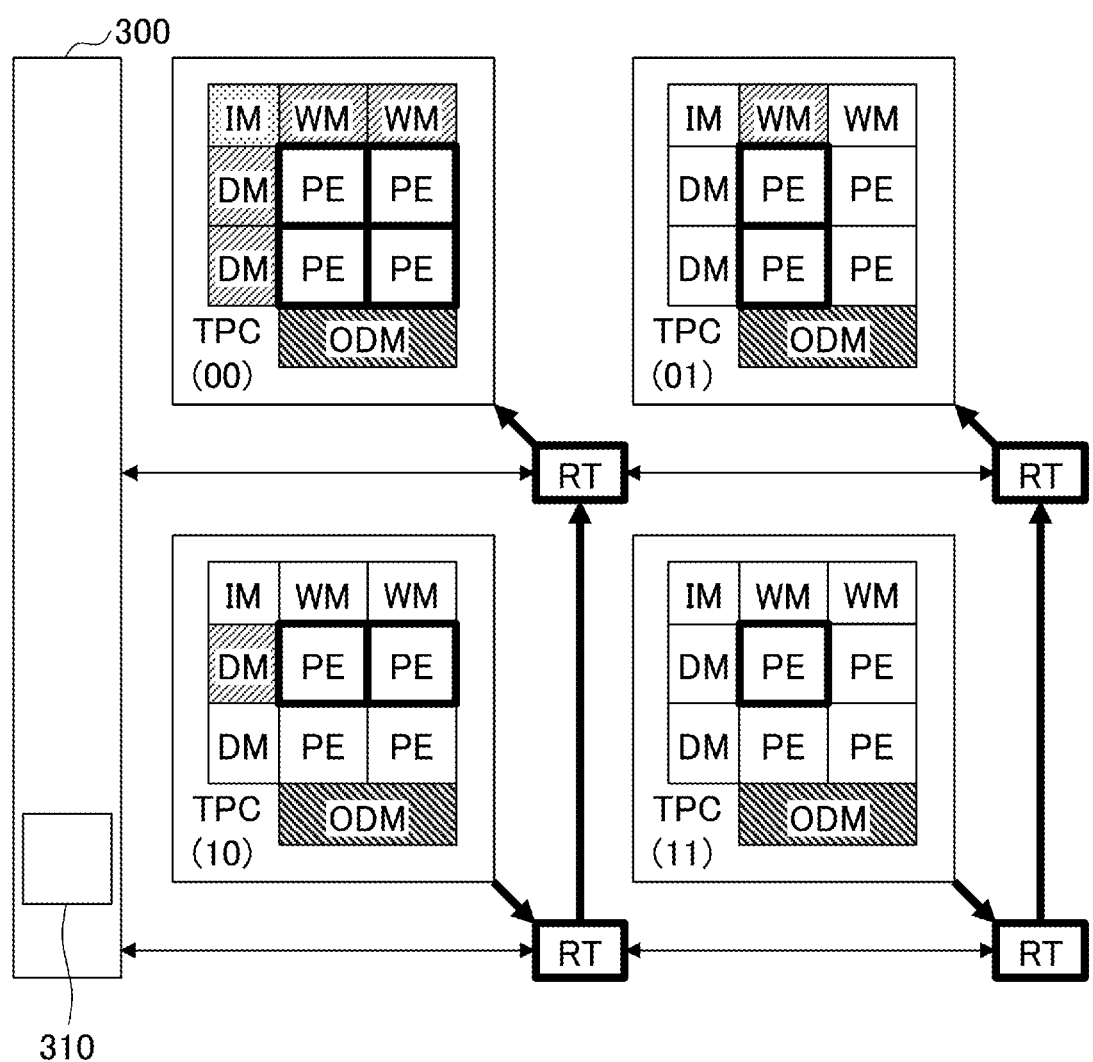
FIG. 15 is another drawing for illustrating the flow of data transmissions described in conjunction with according to one embodiment of the present disclosure.

Next, in FIG. 15, similar to FIGS. 13 and 14, the controller 310 configures the addresses STAD (W) and ENDAD (W) for writing for the weight memories WMs in the TPCs (00) and (01). Also, the controller 310 configures the addresses STAD (R) and ENDAD (R) for reading for the weight memories WMs in the TPCs (10) and (11).

Then, the controller 310 changes the data transmission path to transmit the weight W for use in the next convolutional operation, which is stored in the TPCs (10) and (11), to the TPCs (00) and (01). Namely, the controller 310 reconfigures the routers RTs to configure the data transmission path as a path destined from the TPCs (10) and (11) to the TPCs (00) and (01). Then, the controller 310 outputs a trigger signal for instructing the TPCs (10) and (11) to transmit the weight W and causes the weight W for use in the next convolutional operation to be transmitted from the weight memories WMs in the TPCs (10) and (11) to the weight memories WMs in the TPCs (00) and (01), as illustrated in the slanted lines.

After completion of the convolutional operation, the controller 310 reconfigures the routers RTs to configure the data transmission path as a path destined from the prefetch engine 300 to the TPCs (00) and (10). Then, the controller 310 configures the addresses STAD (R) and ENDAD (R) for reading for the output memories 26 in the TPCs (00) and (10).

Figure 16:
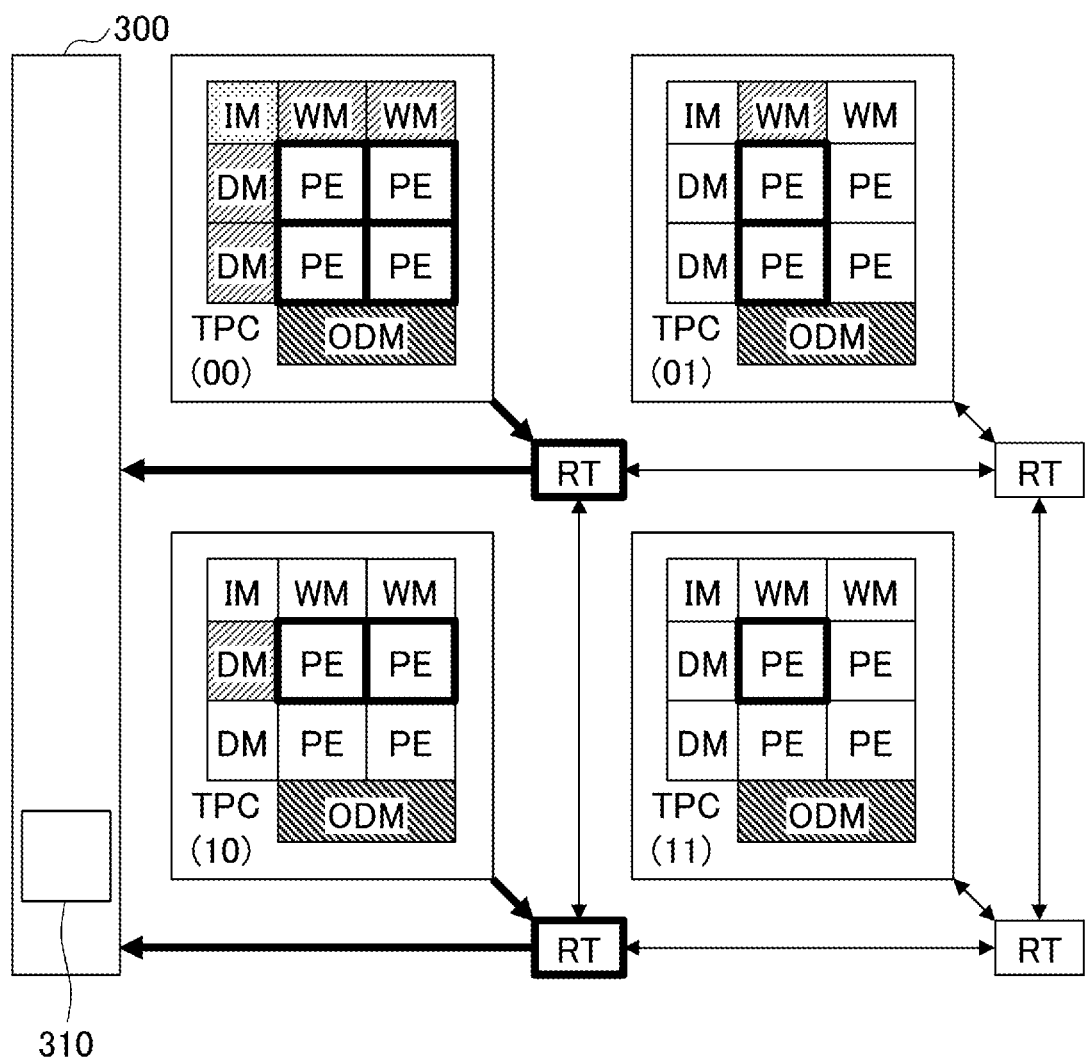
FIG. 16 is another drawing for illustrating the flow of data transmissions described in conjunction with according to one embodiment of the present disclosure.

Next, in FIG. 16, in order to transmit feature maps obtained as a result of the convolutional operations to the prefetch engine 300, the controller 310 reconfigures the routers RTs to configure the data transmission path as a path destined from the TPCs (00) and (01) to the prefetch engine 300. Then, the controller 310 outputs a trigger signal for instructing the TPCs (00) and (10) to transmit the feature maps and causes the feature maps to be transmitted from the TPCs (00) and (10) to the prefetch engine 300.

After that, the routers RTs are reconfigured to transmit the feature maps obtained at the TPCs (01) and (11) to the prefetch engine 300. The feature maps are transmitted from the TPCs (01) and (11) to the prefetch engine 300, and the first convolutional operation is then finished. The next convolutional operation is performed by using the data DT and the weight W transmitted in FIGS. 14 and 15.

Figure 17:
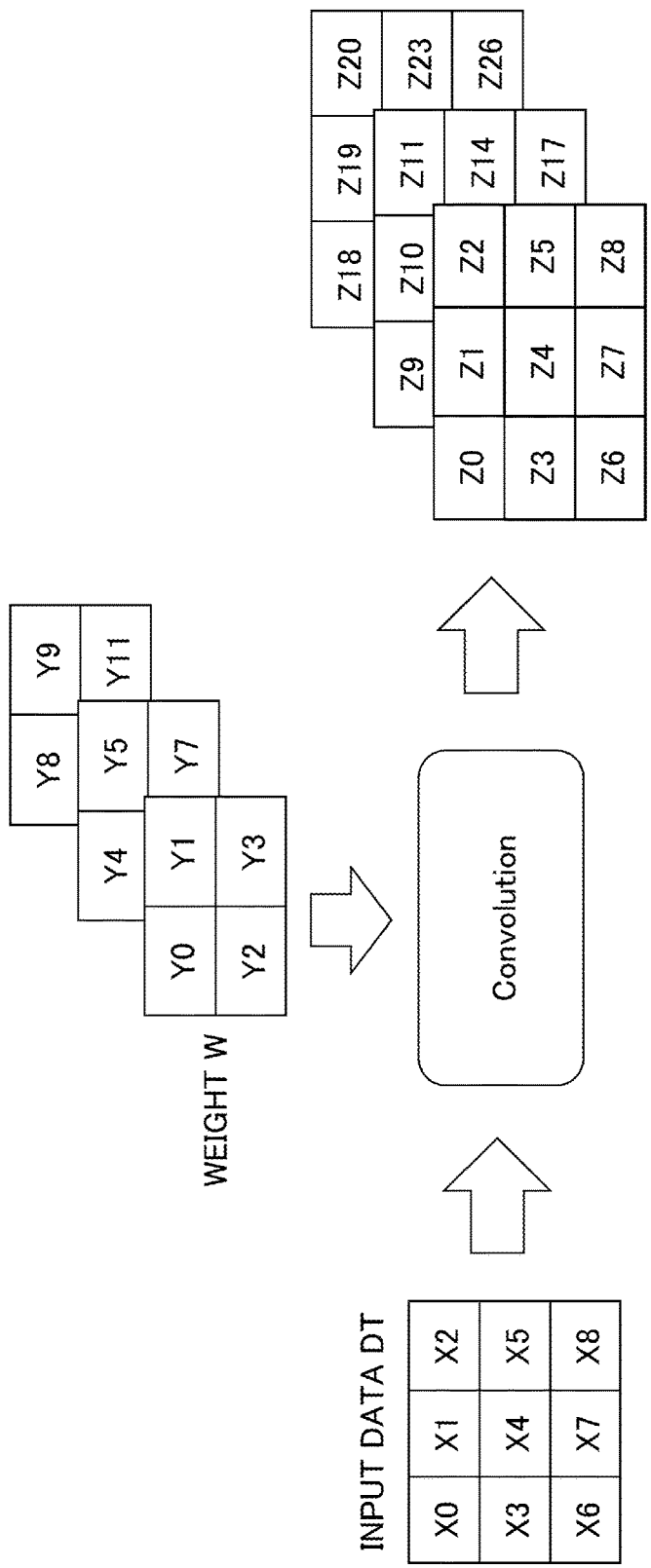
FIG. 17 is a drawing for illustrating a convolutional operation according to one embodiment of the present disclosure.

FIG. 17 is a drawing for illustrating one exemplary convolutional operation. In FIG. 17, an input composed of two rows by two columns in the input data DT (X0-X8) of three rows by three columns and three kernels (Y0-Y3, Y4-Y7 and Y8-Y11) of two rows by two columns are used for the convolutional operation. Then, for each of the kernels, nine outputs Z (Z0-Z8, Z9-Z17 or Z18-Z26) are output. Note that the convolutional operation is performed on the input data DT of three rows by three columns as a matrix of four rows by four columns resulting from padding. The notation "*" in formulae for the outputs Z represents a product.

Figure 18:
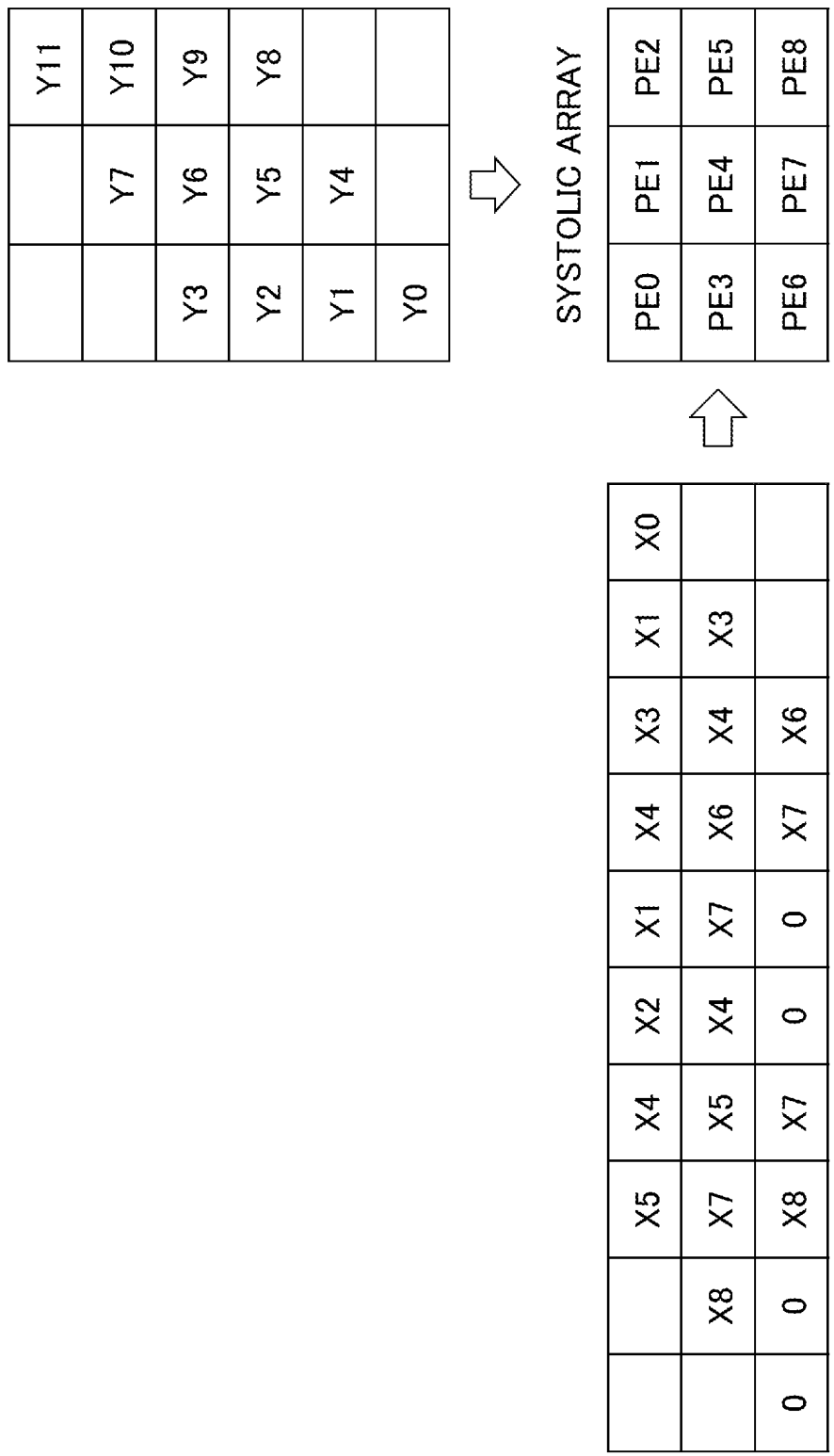
FIG. 18 is a drawing for illustrating execution of the convolutional operation in FIG. 17 with a systolic array reconfigured in the processor in FIG. 1 according to one embodiment of the present disclosure.

FIG. 18 is a drawing for illustrating the convolutional operation in FIG. 17 performed by using a systolic array reconfigured in the processor 100 in FIG. 1. In FIG. 18, a systolic array including nine PEs (PE0 to PE8 in FIG. 18) as indicated in FIG. 3 is used for the convolutional operation. The data X0 to X8 are input data stored in the data memory DM, and the weights Y0 to Y11 are weights stored in the weight memory WM.

The data X0, X1, X3, X4, X1, X2, X4 and X5 are input to the PE0 to PE2 sequentially. The data X3, X4, X6, X7, X4, X5, X7 and X8 are input to the PE3 to PE5 sequentially. The data X6, X7, "0", "0", X7, X8 "0" and "0" are input to the PE6 to PE8 sequentially. The weights Y0 to Y3 are input to the PE0, PE4 and PE7 sequentially. The weights Y4 to Y7 are input to the PE1, PE4 and PE7 sequentially. The weights Y8 to Y11 are input to the PE2, PE5 and PE8 sequentially. Then, the respective PE0 to PE8 use the input data X0 to X8 and the weights Y0 to Y11 to perform a convolutional operation to generate outputs Z0 to Z26 (feature maps).

FIGS. 19 and 20 are drawings for illustrating convolutional operations performed by the PE0 to PE8 as illustrated in FIG. 18. The MAC (FIG. 4) in each of the PEs (PE0 to PE8) calculates products of the data X (X0 to X8) and the weights Y (Y0 to Y11) for each of cycles CYCs (CYC1 to CYC16) and accumulates the calculated products to perform the convolutional operation. At this time, the MAC 44 multiplies the data X supplied from the data memory DM or stored in the register REG with the weight Y supplied from the weight memory WM or stored in the register REG.

The PE0 uses the cycles CYC1 to CYC12 to generate the outputs Z0 to Z2. The PE1 uses the cycles CYC2 to CYC13 to generate the outputs Z9 to Z11. The PE2 uses the cycles CYC3 to CYC14 to generate the outputs Z18 to Z20.

The PE3 uses the cycles CYC2 to CYC13 to generate the outputs Z3 to Z5. The PE4 uses the cycles CYC3 to CYC14 to generate the outputs Z12 to Z14. The PE5 uses the cycles CYC4 to CYC15 to generate the outputs Z21 to Z23.

The PE6 uses the cycles CYC3 to CYC14 to generate the outputs Z6 to Z8. The PE7 uses the cycles CYC4 to CYC15 to generate the outputs Z15 to Z17. The PE8 uses the cycles CYC5 to CYC16 to generate the outputs Z24 to Z26.

Then, the convolutional operation is performed at 16 cycles, and the outputs Z0 to Z26 are stored in the output memory 26 at three cycles. As a result, the convolutional operation as illustrated in FIG. 17 will have been finished at 19 cycles.

According to this embodiment, the convolutional operation is performed by using not only the data X and the weight Y supplied from the data memory DM and the weight memory WM but also the data X and the weight Y stored in the register REG. In this manner, the convolutional operation can be performed for the three kernels without retransmission of the data X and the weight Y to the data memory DM and the weight memory WM, and accordingly the number of cycles involved in the convolutional operation as illustrated in FIG. 17 can be decreased.

Figure 21:
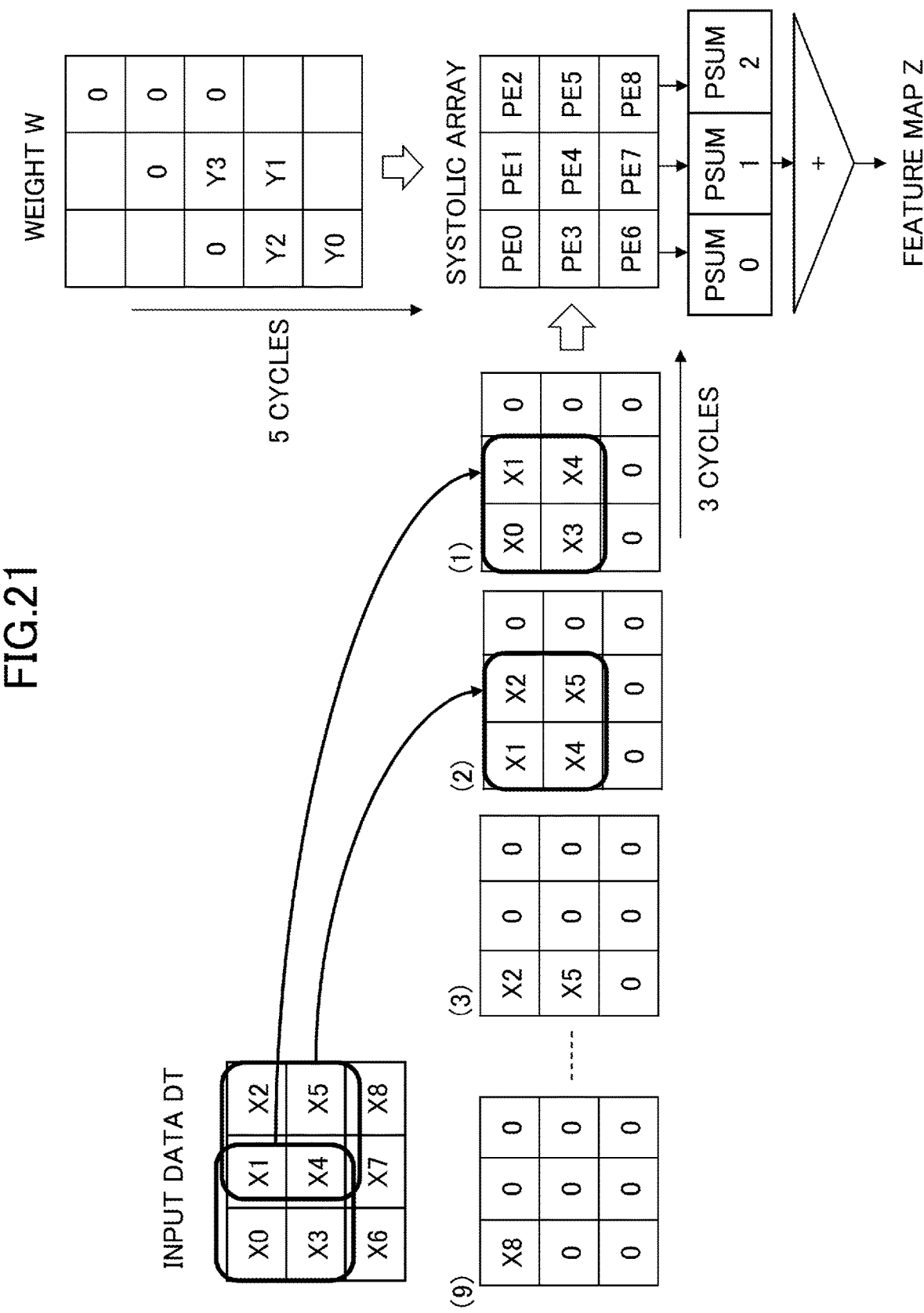
FIG. 21 is a drawing for illustrating execution of the convolutional operation in FIG. 17 with a systolic array in another processor according to one embodiment of the present disclosure.

FIG. 21 is a drawing for illustrating one exemplary convolutional operation in FIG. 17 performed with a systolic array in another processor for comparison. FIG. 21 illustrates that the convolutional operation is performed with only the single kernel (Y0 to Y3) among the three kernels (Y0 to Y3, Y4 to Y7 and Y8 to Y11).

In FIG. 21, each of the nine sets (for example, X0, X1, X3, X4 or X1, X2, X4, X5) extracted from the input data DT (X0 to X8) is convoluted with the kernel (Y0 to Y3) by using the PE0 to PE8 in the systolic array.

After the input data DT for each set has been loaded into the systolic array at three cycles, the convolutional operation is performed while transmitting the weight W to the systolic array sequentially in five cycles. Then, products of the respective input data DT and the respective weights W are accumulated for each column of the systolic array to output sums PSUM0 to PSUM2, and the total sum of PSUM0 to PSUM2 is output as a feature map Z.

In the convolutional operation in FIG. 21, it takes three cycles, five cycles and one cycle to load the input data, perform the convolutional calculation and output the feature map Z, respectively. As a result, it takes nine cycles to perform the convolutional operation for one set of the input data DT and a single weight kernel, and it takes 243 cycles to perform the convolutional operation for the nine sets of input data and three weight kernels.

Figure 22:
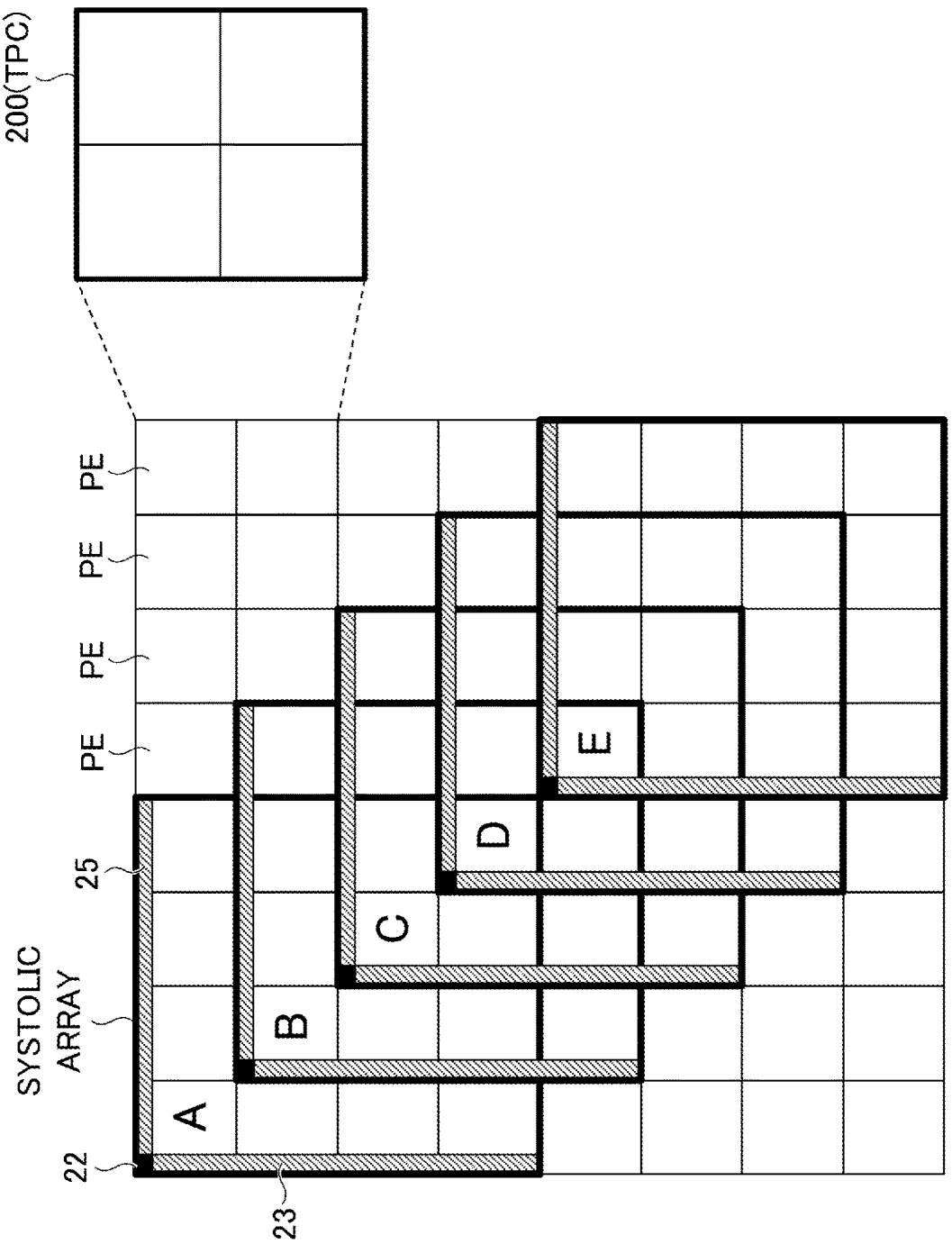
FIG. 22 is another drawing for illustrating the convolutional operation executed by the processor in FIG. 1 according to one embodiment of the present disclosure.

FIG. 22 is a drawing for illustrating another exemplary convolutional operation performed by the processor 100 in FIG. 1. In FIG. 22, sixteen TPCs 200 (64 PEs 400) arranged in four by four in the vertical and horizontal directions are used to form systolic arrays each including sixteen PEs 400 sequentially while shifting the PEs 400 to be included. Areas surrounded with slanted lines represent the data memory 23 and the weight memory 25 having the data DT and the weight W stored for use in the convolutional operation, and the bold rectangles represent the instruction memory 22 to store the instruction INST for convolutional operations.

For example, systolic array A including sixteen PEs 400 located at an upper left position in FIG. 22 is reconfigured. The data DT is transferred to the data memory 23 located at the left side of the systolic array A, and the weight W is transferred to the weight memory 25 located at the upper side of the systolic array A. Also, the instruction INST is transferred to the instruction memory 22 located at the upper-left side of the systolic array A. Then, the systolic array A initiates the convolutional operation.

During the convolutional operation, systolic array B is reconfigured by shifting the PEs 400 by one in the upper right direction for the systolic array A currently performing the convolutional operation, and the data DT, the weight W and the instruction INST are transferred to the systolic array B. After completion of the convolutional operation with the systolic array A, the systolic array B initiates the convolutional operation. During the convolutional operation by the systolic array B, feature maps obtained in the convolutional operation are transmitted, and systolic array C is reconfigured by shifting the PEs 400 by one in the lower right direction. Then, the data DT, the weight W and the instruction INST are transmitted to the systolic array C.

After that, during execution of the convolutional operation with the systolic array, feature maps are transmitted from the systolic array, when the convolutional operation is completed. Also, another systolic array is reconfigured, and the data DT, the weight W and the instruction INST are transferred. Through iteration of the above procedure, transmission of the feature maps obtained in the convolutional operation, reconfiguration of the systolic arrays and transmission of the data DT, the weight W and the instruction INST can be performed in the background of the convolutional operation. As a result, the processing efficiency can be improved compared to the case where the reconfiguration and the data transmissions are performed separately from the convolutional operation. Also in the example as illustrated in FIG. 22, only one transmission of the data DT and the weight W to the systolic array is required, and the data DT and the weight W do not need to be transmitted in the systolic array.

In the embodiments of the present disclosure as stated above, the PEs 400 in the multiple TPCs 200 can be interconnected each other via the multiplexers 272 to 275, and the size of the systolic array for use in convolutional operations can be arbitrarily set. Since the size of the systolic array is variable, the convolutional operation can be performed for various amounts of data without dividing the data. In this manner, the present disclosure can be applied to the convolutional operations for new matrix sizes that are not supported, for example. Namely, the reconfiguration control units 281 to 283 and the multiplexers 272 to 275 can be used to reconfigure the systolic array having an optimal size corresponding to the amount of data DT for use in the convolutional operations.

Since the data memory 23 and the weight memory 25 are provided for each TPC 200, the data DT for use in the next convolutional operation can be transferred to the data memory 23 unused for the convolutional operation beforehand. Also, the weight W for use in the next convolutional operation can be transferred to the weight memory 25 unused for the convolutional operation beforehand. Since the unused data memory 23 and the unused weight memory 25 are irrelevant to the convolutional operation, the data DT or the weight W can be transmitted during the convolution operation.

Also, the data for use in the next convolutional operation can be transmitted to the unused data memory 23 and the unused weight memory 25 during the convolutional operation. Alternatively, while the convolutional operation is being performed, the data DT can be transferred among the data memories 23, and the weight W can be transferred among the weight memories 25. As a result, after completion of the convolutional operation, the next convolutional operation can be initiated without transmitting the data DT and the weight W from the controller 310, and the processing efficiency can be improved. Also, the number of transmission times of the data DT and the weight W to the systolic array can be decreased, and the processing efficiency can be improved.

The address generation unit 21 generates addresses based on address generation information, which allows the data DT stored in the data memory 23 to be output in any order, and the stride value or the like can be changed without storing the data DT in the data memory 23 again. As a result, the load cycle of the data DT can be decreased, and the efficiency of the convolutional operations performed by the processor 100 can be improved.

Provision of the multiple types of arithmetic operators 43 and 44 and the register file 42 in the PE 400 allows not only multiplication in the convolutional operations but also various arithmetic and logical operations to be performed as in CPUs. Accordingly, the processor can be used for not only the convolutional operations but also various operations of layers in deep learning. For example, subsequently to the convolutional operations, operations (extraction of maximum values, averaging or the like) in a pooling layer in the PE 400 can be performed. Also, the convolutional operations including accumulation of products can be performed in the PE 400.

Results stored in the register REG can be used to perform operations other than the convolutional operations. In addition, the weight W supplied from the outside can be bypassed to the register REG, and accordingly the convolutional operations can be performed by using the weight W in the register REG repeatedly. As a result, for example, the number of transmission times of the data DT and the weight W to the data memory 23 and the weight memory 25 can be decreased compared to some conventional schemes, and the convolutional operations using the systolic array can be performed more efficiently.

The instruction INST for use in the convolutional operations is transmitted to only the instruction memory 22 corresponding to the upper left portion in the systolic array. The instruction INST stored in the single instruction memory 22 is sequentially transmitted to the PEs 400, which execute the convolutional operations, via the multiplexer 271. The instruction INST does not need to be stored in all the instruction memories 22 in the TPCs 200 forming the systolic array, and accordingly the transferring efficiency of the instruction INST from the controller 310 to the instruction memory 22 can be improved.

Since the output memory 26 is provided for each TPC 200, feature maps can be directly output to a NOC without passage to other TPCs 200, and the transferring efficiency of feature maps to the prefetch engine 300 can be improved.

The present disclosure is not limited to the above-stated specific embodiments, and various variations and modifications can be made without deviating from the scope of claims.

What is claimed is:

1. A processor, comprising:
   a plurality of processing cores arranged in a matrix of two or more rows and two or more columns, each of the plurality of processing cores including:
      at least one arithmetic circuit configured to perform arithmetic operation on first data and second data; and
      at least one memory;
   a plurality of information transfer circuits arranged in a matrix of two or more rows and two or more columns, each of the plurality of information transfer circuits being connected to at least one corresponding processing core of the plurality of processing cores; and
   transmission paths connecting adjacent processing cores among the plurality of processing cores,
   wherein each of the plurality of information transfer circuits is connected to at least one adjacent information transfer circuit of the plurality of information transfer circuits, and the plurality of information transfer circuits thereby form a network, and
   wherein at least one of the plurality of processing cores is configured to receive the first data and the second data through the network, and is also configured to receive the first data directly from a left adjacent processing core among the plurality of processing cores through at least one of the transmission paths that are different from the network, and to receive the second data directly from an upper adjacent processing core among the plurality of processing cores through at least one of the transmission paths that are different from the network, so that the at least one of the plurality of processing cores receives the first data and the second data either through the network or through at least one of the transmission paths.

2. The processor as claimed in claim 1, wherein each of the plurality of processing cores is connected to at least one adjacent processing core of the plurality of processing cores.

3. The processor as claimed in claim 1, wherein at least one first processing core of the plurality of processing cores is connected to four adjacent processing cores of the plurality of processing cores.

4. The processor as claimed in claim 1, wherein at least one second processing core of the plurality of processing cores is connected to only three adjacent processing cores of the plurality of processing cores.

5. The processor as claimed in claim 1, wherein at least one third processing core of the plurality of processing cores is connected to only two adjacent processing cores of the plurality of processing cores.

6. The processor as claimed in claim 1, wherein the at least one memory stores weight data.

7. The processor as claimed in claim 1, wherein the at least one memory stores input data.

8. The processor as claimed in claim 1, wherein each of the plurality of information transfer circuits is a router.

9. The processor as claimed in claim 1, wherein each of the plurality of processing cores includes at least one instruction memory that stores at least one instruction for the at least one arithmetic circuit, and the at least one instruction stored in the at least one instruction memory of at least one first processing core of the plurality of processing cores is transferred to at least one adjacent processing core of the plurality of processing core.

10. The processor as claimed in claim 1, wherein each of the plurality of processing cores include at least one output memory,
   wherein the at least one output memory of any given one of the plurality of processing cores receives at least one operational result of the arithmetic circuit of the given one of the plurality of processing cores,
   wherein the at least one output memory of the given one of the plurality of processing cores transmits the at least one operational result to a corresponding one of the plurality of information transfer circuits.

11. A method of transferring data in a processor that includes:
- a plurality of processing cores arranged in a matrix of two or more rows and two or more columns, each of the plurality of processing cores including:
  - at least one arithmetic circuit configured to perform arithmetic operation on first data and second data; and
  - at least one memory;
- a plurality of information transfer circuits arranged in a matrix of two or more rows and two or more columns, each of the plurality of information transfer circuits being connected to at least one corresponding processing core of the plurality of processing cores; and
- transmission paths connecting adjacent processing cores among the plurality of processing cores,
- wherein each of the plurality of information transfer circuits is connected to at least one adjacent information transfer circuit of the plurality of information transfer circuits, and the plurality of information transfer circuits thereby form a network, and
- wherein at least one of the plurality of processing cores is configured to receive the first data and the second data through the network, and is also configured to receive the first data directly from a left adjacent processing core among the plurality of processing cores through at least one of the transmission paths that are different from the network, and to receive the second data directly from an upper adjacent processing core among the plurality of processing cores through at least one of the transmission paths that are different from the network, so that the at least one of the plurality of processing cores receives the first data and the second data either through the network or through at least one of the transmission paths, the method comprising
- transferring the first data or the second data from the at least one memory of a first processing core of the plurality of processing cores to the at least one memory of a second processing core of the plurality of processing cores via at least two information transfer circuits of the plurality of information transfer circuits.

12. The method as claimed in claim 11, further comprising transferring at least one instruction from at least one instruction memory of a third processing core of the plurality of processing cores to a fourth processing core of the plurality of processing cores.

13. The method as claimed in claim 12, further comprising transferring the at least one instruction from at least one instruction memory of the fourth processing core of the plurality of processing cores to a fifth processing core of the plurality of processing cores.

14. The method as claimed in claim 11, further comprising transferring weight data from a third processing core of the plurality of processing cores to a fourth processing core of the plurality of processing cores.

15. The method as claimed in claim 14, further comprising transferring the weight data from the fourth processing core of the plurality of processing cores to a fifth processing core of the plurality of processing cores.

16. The method as claimed in claim 11, further comprising transferring at least one operational result of the arithmetic circuit of each of the plurality of processing cores to a corresponding one of the plurality of information transfer circuits.

17. The method as claimed in claim 11, wherein the first data and the second data are transferred during an execution of calculation of the at least one arithmetic circuit.

18. The method as claimed in claim 12, wherein the at least one instruction is transferred during an execution of calculation by the at least one arithmetic circuit.

19. The method as claimed in claim 14, wherein the weight data is transferred during an execution of calculation by the at least one arithmetic circuit.

20. The method as claimed in claim 12, wherein at least one arithmetic circuit of the third processing core of the plurality of processing cores receives the at least one instruction, and does not have function to transfer the at least one instruction to the fourth processing core.

* * * * *